United States Patent [19]

Akashi

[11] Patent Number: 4,855,776

[45] Date of Patent: Aug. 8, 1989

[54] CAMERA WITH AUTOMATIC FOCUSING DEVICE

[75] Inventor: Akira Akashi, Yokohama, Japan

[73] Assignee: Canon Kabushiki Kaisha, Tokyo, Japan

[21] Appl. No.: 143,033

[22] Filed: Jan. 12, 1988

[30] Foreign Application Priority Data

Jan. 12, 1987 [JP] Japan .................................. 62-004561
Jan. 12, 1987 [JP] Japan .................................. 62-004574

[51] Int. Cl.[4] ............................................... G03B 3/00
[52] U.S. Cl. .................................... 354/402; 354/406;
354/408
[58] Field of Search ............... 354/400, 402, 406, 407,
354/408, 409

[56] References Cited

U.S. PATENT DOCUMENTS

| 4,335,942 | 6/1982 | Tsunekawa et al. | 354/408 |
| 4,459,006 | 7/1984 | Sakai et al. | 354/406 |
| 4,474,449 | 10/1984 | Kusaka | 354/408 |
| 4,572,643 | 2/1986 | Akashi | 35/409 |
| 4,588,278 | 5/1986 | Horigome | 354/406 |
| 4,617,459 | 10/1986 | Akashi et al. | |
| 4,618,235 | 10/1986 | Ishida et al. | 354/406 |
| 4,641,942 | 2/1987 | Sakai et al. | 354/406 |
| 4,721,975 | 1/1988 | Hamada | 354/408 |

FOREIGN PATENT DOCUMENTS 60-147710 8/1985 Japan .

Primary Examiner—Russell E. Adams
Attorney, Agent, or Firm—Fitzpatrick, Cella, Harper & Scinto

[57] ABSTRACT

A camera capable of following the movement of an object and constantly maintaining the lens in focus. During a certain period after a focused state is detected, lens drive is forbidden even if a large defocus amount is detected, but the lens is driven during this period if a small defocus amount is detected.

17 Claims, 16 Drawing Sheets

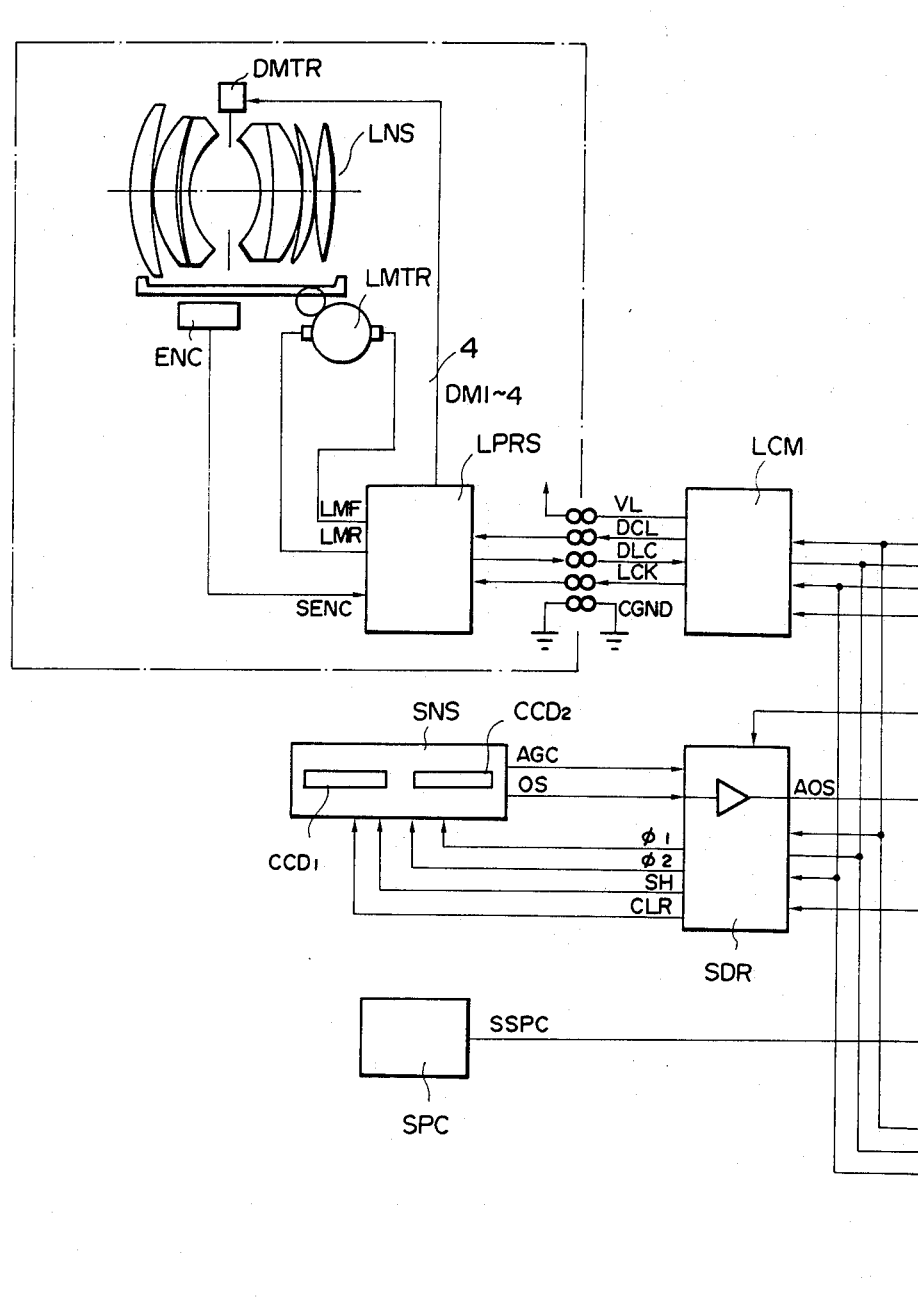

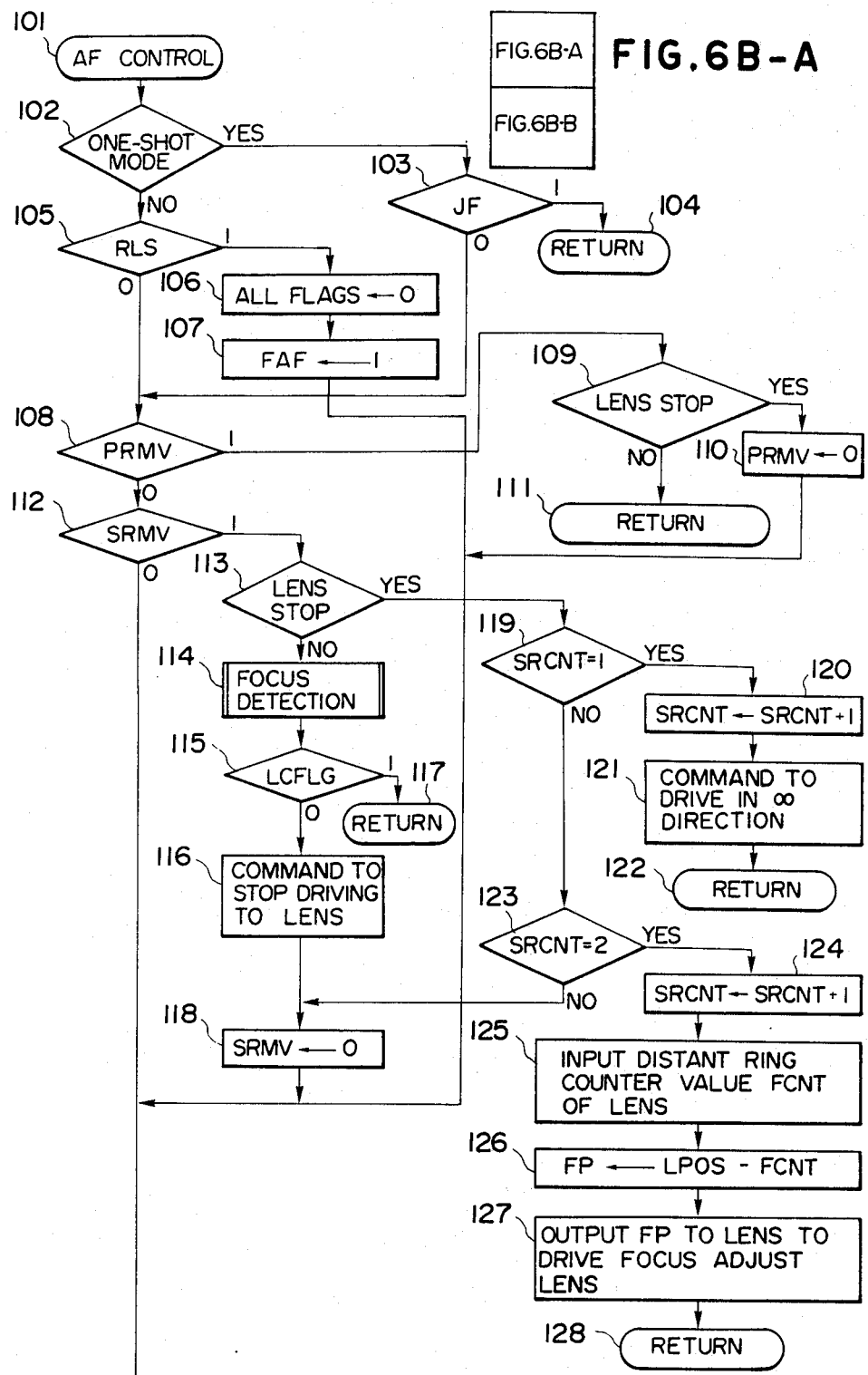

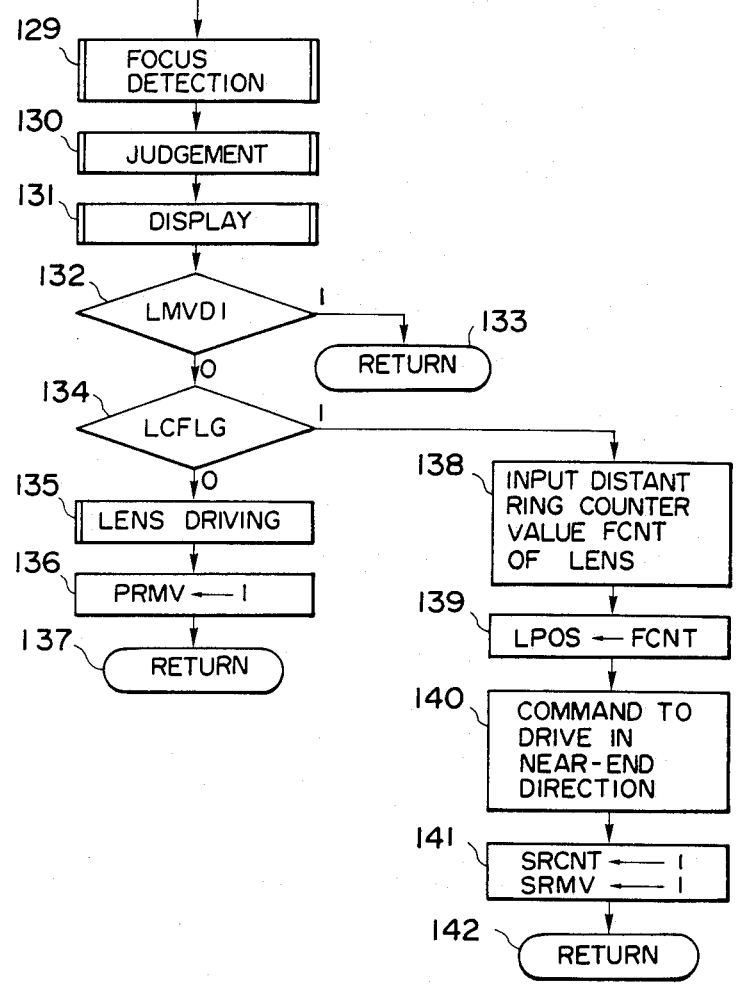

CAMERA WITH AUTOMATIC FOCUSING DEVICE

BACKGROUND OF THE INVENTION

1. Field of the Invention

The present invention relates to a camera equipped with an automatic focusing device.

2. Related Background Art

A conventional automatic focusing device brings a lens to an in-focus position by repeatedly detecting the amount of defocus from the in-focus position through a focus detecting operation and driving the lens in response to the detected amount of defocus until said detected amount of defocus reaches a small enough amount to be considered as in the in-focus state, and maintains the lens constantly in the in-focus state by re-starting said lens driving based on the detected amount of defocus when a detection conducted after the lens driving to said in-focus state identifies an amount of defocus exceeding the above-mentioned amount of defocus considered as an in-focus state.

Such conventional automatic focusing devices can satisfactorily follow the movement of the object as the lens, if subsequently found in an out-of-focus state, is immediately brought again to an in-focus state. However if the covered field of distance measurement is deflected from the desired object for example by the vibration of the camera, the lens may be moved to an in-focus state for an object different from the desired object.

Also the above-mentioned focus detecting operation is capable of a precise focus detection if the image of an object has a sufficiently high contrast, but is incapable of such focus detection if the contrast is low. As a countermeasure for such a situation, there is often conducted a so-called search operation in which the photographing lens is moved regardless of the result of focus detection, expecting the contrast of the object to rise.

This is because such low contrast may arise from two reason; a virtual low contrast of the object, and a low contrast resulting from a large amount of defocus of the photographic lens.

Such a search operation is conducted by a full reciprocating cycle of a focusing ring of the lens from an end corresponding to the infinite distance to the other end corresponding to the closest distance. Thus, for example, in a camera equipped with a telephoto lens, said search operation may be initiated even when the focusing frame in the view finder of the camera is momentarily deviated from the desired object for example by a shaking of the camera and a low contrast, and the in-focus state can be restored only after said full reciprocating cycle in the search operation.

SUMMARY OF THE INVENTION

An aspect of the present invention is to maintain the in-focus state for the desired object even when the focusing frame in the view finder is deviated therefrom for example by a shaking of the camera, without sacrificing the ability of the conventional automatic focusing device to follow the movement of the object.

The amount of defocus is generally large if the focusing frame in the view finder is deflected from the desired object for example by a shaking of the camera, but said amount of defocus, detected as the result of movement of the object after the focusing operation is made for the object in the focusing frame, is generally small.

In consideration of these facts, the above-mentioned object can be achieved, according to the present invention, by prohibiting, if a large amount of defocus is detected after a focusing operation, the lens driving based on said large defocus amount for a predetermined period.

Another aspect of the present invention is to achieve the above-mentioned object, by discriminating the magnitude of defocus after a focusing operation, driving the lens immediately in response to the detected amount of defocus if said amount is small thereby allowing the lens to follow the object, but, in case of a large amount of defocus, prohibiting the lens drive based on the detected defocus amount for a predetermined period after said focusing operation, considering such large defocus amount as the result of deflection of the focusing frame.

Still another aspect of the present invention is to provide an automatic focusing device with the above-explained search function, capable of prohibiting said search operation in case a low contrast is found within a predetermined period after a focusing operation, thereby avoiding such search operation in case of a low contrast situation resulting for example from a shaking of the camera.

The foregoing and still other objects of the present invention, and the advantages thereof, will become fully apparent from the following description of the embodiments, to be taken in conjunction with the attached drawings.

BRIEF DESCRIPTION OF THE DRAWINGS

FIGS. 6A to 6F are flow charts showing programs stored in a computer PRS shown in FIG. 5.

DETAILED DESCRIPTION OF THE PREFERRED EMBODIMENTS

The present invention, aimed at resolving the aforementioned drawbacks, has a feature, after the result of focus detection has reached a focused or near-focus state, of immediately conducting a lens driving operation if the amount of defocus found subsequently is within a predetermined value but prohibiting said lens driving for a predetermined first period of time from a point when said focused or near-focus state is reached if said amount of defocus exceeds said predetermined value, and prohibiting a search operation for a low contrast situation for a predetermined second period of time longer than said first period, thereby improving the operability particularly when a telephoto lens is mounted.

Figure 1:
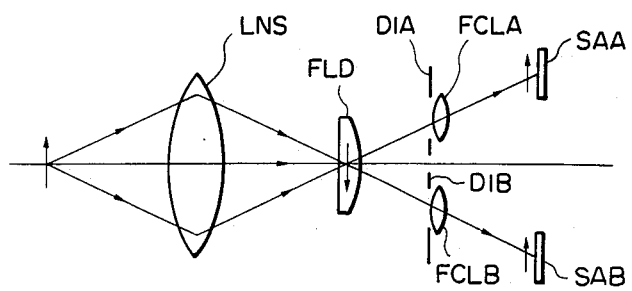
FIG. 1 is a schematic view of the optical system of the automatic focusing device of the present invention.

At first, reference is made to FIG. 1 for explaining the principle of focus detection employed in the present invention. A field lens FLD is positioned concentrically with a photographing lens LNS to be subjected to focus detection. There are also provided two imaging lenses FCLA, FCLB symmetrically disposed with respect to the optical axis behind said lens LNS, and sensor arrays SAA, SAB therebehind. Diaphragms DIA, DIB are provided in the vicinity of said secondary imaging lenses FCLA, FCLB. The field lens FLD forms the image of an exit pupil of the photographing lens LNS, substantially on a pupil plane of two secondary imaging lenses FCLA, FCLB. Consequently the light beams respectively entering the secondary imaging lenses FCLA, FCLB emerge from areas of a same size, which are present, without mutual overlapping, on the exit pupil plane of the photographing lens LNS, respectively corresponding to said secondary imaging lenses FCLA, FCLB. As an aerial image formed in the vicinity of the field lens FLD is refocused by the secondary imaging lenses FCLA, FCLB respectively on the sensor arrays SAA, SAB, the two images thereon vary their positions according to a displacement of the position of said aerial image in the axial direction. Consequently the focus state of the photographing lens LNS can be known by detecting the relative positional displacement of two images on said sensor arrays.

Figure 2:
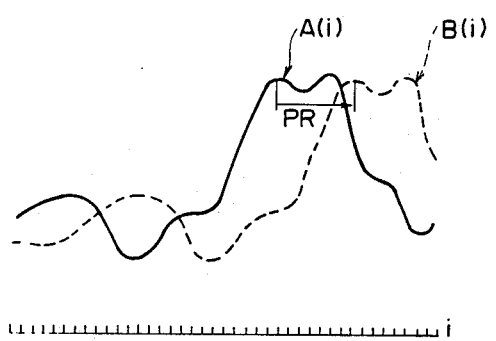
FIG. 2 is a wave form chart showing the output of a sensor shown in FIG. 1.

FIG. 2 shows an example of photoelectrically converted outputs A (i), B (i) of two images respectively formed on the sensor arrays SAA, SAB. In this example it is assumed that each sensor has 40 pixels (i=0, ..., 39).

The present applicant already proposed signal processing methods for detecting the displacement PR of the images from the image signals A (i), B (i), for example in the Japanese Patents Laid-open Nos. 142306/1973, 107313/1984 and 101513/1985, and in the Japanese Patent Application No. 160824/1986.

The photographing lens can be brought to a focused state, by a focusing operation of said lens based on the amount of image displacement determined by the methods disclosed in said references.

Figure 3B:
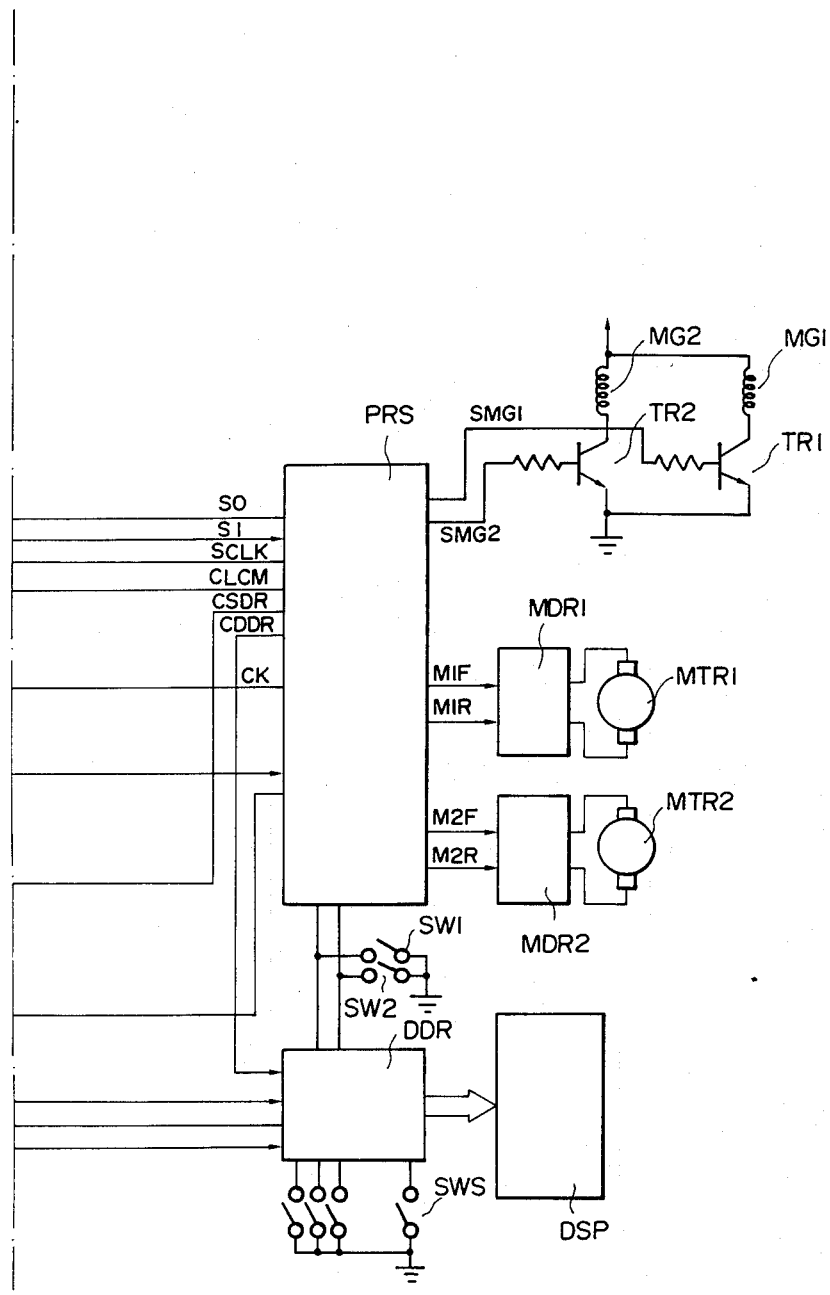
FIG. 3 is a circuit diagram of an embodiment of a camera equipped with the automatic focusing device of the present invention.

FIG. 3 is a circuit diagram showing an embodiment of a camera equipped with an automatic focusing device of the present invention, wherein a camera control unit PRS is composed of a one-chip microprocessor incorporating a ROM, a RAM, an A/D converter etc. and executes the functions of automatic exposure control, automatic focus detection, film winding, film rewinding etc. according to programs stored in said ROM.

The microprocessor PRS communicates with peripheral circuits and the lens by means of communication signals SO, SI and SCLK, thus controlling the functions of said circuits and lens.

SO is a data signal released from the microprocessor PRS, while SI is a data signal entered thereinto, and SLCK is a synchronization signal for said signals SO, SI.

A lens communication buffer circuit LCM supplies a lens power supply VL to the lens when the camera is in operation, and serves as a buffer in the communication between the camera and the lens when a signal CLCM from the microprocessor PRS in at a high (H) level state.

When the microprocessor PRS shifts said signal CLCM to the H-level state and releases predetermined data as the signal SO in synchronization with the SCLK signal, the circuit LCM supplies the lens, through designated contacts between the camera and the lens, with buffered signals LCK, DCL respectively corresponding to said signals SCLK, SO. Simultaneously a signal DLC from the lens (area surrounded by chain line) is buffered and released as the signal SI, and the microprocessor PRS receives said signal SI indicating the lens data in synchronization with the SCLK signal.

A sensor drive circuit SDR for a line sensor unit SNS for focus detection is selected when a signal CSDR from the microprocessor PRS is at the H-level state, and is controlled by the microprocessor PRS through the signals SO, SI and SCLK.

The sensor unit SNS is provided for example with a pair of CCD line sensors CCD1, CCD2 corresponding to SAA, SAB in FIG. 1. The sensor drive circuit SDR controlled by the microprocessor PRS generates CCD driving clock signals $\phi 1$, $\phi 2$ generated in response to a clock signal CK from the microprocessor PRS; a signal SH for transferring the charges accumulated in the line sensors CCD1, CCD2 to a transfer unit; and a clear signal CLR for clearing the charges accumulated in the line sensors CCD1, CCD2.

An output signal OS of the sensor unit SNS, composed of image signals accumulated in the pixels of the sensors CCD1, CCD2, is time-sequentially released bit by bit in synchronization with the clock signals $\phi 1$, $\phi 2$, then amplified by an amplifier in the drive circuit SDR to a signal AOS and supplied to the microprocessor PRS, which receives said signal AOS from an analog input port, and, after an A/D conversion by an internal A/D converter, stores it in succession in predetermined addresses of the RAM in synchronization with the clock signal CK.

Another output signal AGC of the sensor unit SNS is released by an accumulation control sensor therein, and is supplied to the drive circuit SDR for controlling the accumulation time of the sensors CCD1, CCD2.

A light metering sensor SPC receives light through the photographing lens and supplies the analog input port of the microprocessor PRS with an output signal SSPC, which is utilized, after A/D conversion, for automatic exposure control (AE) functions.

A switch-sensing and display circuit DDR is selected when a signal CDDR from the microprocessor PRS is at the H-level state, and is subjected to a communication control procedure with the microprocessor PRS by the signals SO, SI, SCLK. Said circuit switches the display of the camera in response to the data supplied from the microprocessor PRS, and transmits, to the microprocessor PRS, the status of switches SW1, SW2 linked to a release button and other switches actuated by various operating members.

Drive circuits MDR1, MDR2 for a film feeding motor MTR1 and a shutter charging motor MTR2 execute forward and reverse rotations of said motor by means of signals M1F, M1R, M2F, M2R.

Solenoids MG1, MG2 for activating a leading curtain and a trailing curtain of the shutter are energized by signals SMG1, SMG2 and amplifying transistors TR1, TR2, and the shutter is controlled by the microprocessor PRS.

The switch-sensing and display circuit DDR, the motor drive circuits MDR1, MDR2 and the mode of shutter control will not be explained further as they are not directly related with the present invention.

The signal DCL supplied to a control circuit LPRS in the lens in synchronization with the synchronization with LCK, is an instruction to the lens from the camera, and the function of the lens is predetermined for each instruction.

The control circuit LPRS analyzes said input instruction according to a predetermined procedure, and executes focusing and diaphragm control and releases various lens parameters (fully open F number, focal length, coefficient of lens advancement as a function of defocus etc.) as the output signal DLC.

In the present embodiment, there is employed a single lens moved as a single unit. In response to a focusing command from the camera, a focusing operation is conducted by sending signals LMF, LMR, according to the amount and direction of drive simultaneously instructed with said command, to the focusing motor LMTR. The amount of movement of the optical system is monitored by a signal SENC of an encoder circuit ENC, and, when the predetermined movement is completed, the signals LMF, LMR are shifted to "0" and "L"-level to control the motor LMTR.

In case a diaphragm control command is sent from the camera, there is driven a known stepping motor DMTR linked to a diaphragm mechanism, according to the number of stops simultaneously instructed from the camera. Since the stepping motor is capable of an open control, it does not need an encoder for monitoring the operation.

The above-mentioned circuit LPRS is provided with a memory storing, in predetermined addresses, lens parameters such as the focal length f thereof (in case of a zoom lens, focal length information corresponding to the zoom state), and a control circuit for discriminating the stop state of the lens by sensing the monitor signal SENC, then comparing the amount of lens movement represented by the monitor signal SENC with the amount of defocus to be explained later and shifting the signals LMF, LMR to the L-level and thus stopping the motor LMTR.

A display unit DSP has display elements such as light-emitting diodes for displaying a focused state or a focus detection disabled state.

An encoder ENC is composed for example of a pulse disk rotating in relation to the displacement of the lens and generating pulses as the above-mentioned monitor signal.

Now reference is made to FIG. 4 for explaining the function of the camera of the above-explained structure.

When an unrepresented power switch is actuated, there is initiated power supply to the microprocessor PRS, which thus executes the stored programs.

Figure 4A:
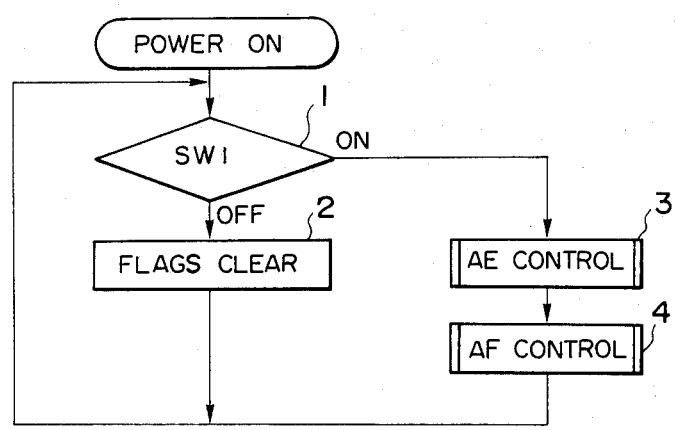
FIGS. 4A to 4D are flow charts of control programs stored in a computer PRS shown in FIG. 1.

FIG. 4A is a flow chart showing the entire flow of said program. When the execution of the stored program is started as explained above, a step 1 discriminates the state of a switch SW1 to be closed by the depression of the shutter button over a first stroke, and, if said switch SW1 is open, a step 2 clears all the internal flags of the microprocessor PRS to zero. Said steps 1 and 2 are repeated until the switch SW1 is closed, and, when said switch is closed, the sequence proceeds to a step 3. The discrimination of the state of the switch SW1 is achieved by shifting the signal CDDR from the microprocessor PRS to the H-level to select the circuit DDR, transmitting a discrimination command for the switch SW1 as the signal SO to said circuit DDR thereby causing the circuit DDR to detect the state of the switch SW1, and transmitting the result of detection as the signal SI to the microprocessor PRS. The step 3 is an automatic exposure control subroutine, which controls a series of operations including light metering, data processing, exposure control, shutter charging after exposure and film advancement. The details of said automatic exposure control subroutine will not be explained as it is not directly related to the present invention, but the outline of said subroutine is as follows.

As long as the switch SW1 is closed, the light metering and exposure control are conducted at every execution of said automatic exposure control (AE) subroutine. Then, when the switch SW2 is closed by the depression of the shutter button over a second stroke, a shutter release operation is conducted by an interruption process to control the diaphragm stop value and the shutter time according to the amount of exposure determined in the above-mentioned exposure control process, and, after the exposure, there are conducted shutter charging and film advancement.

When the shutter button is depressed over the first stroke, after the light metering and exposure calculation in the step 3, the sequence proceeds to a step 4.

Figure 4B:
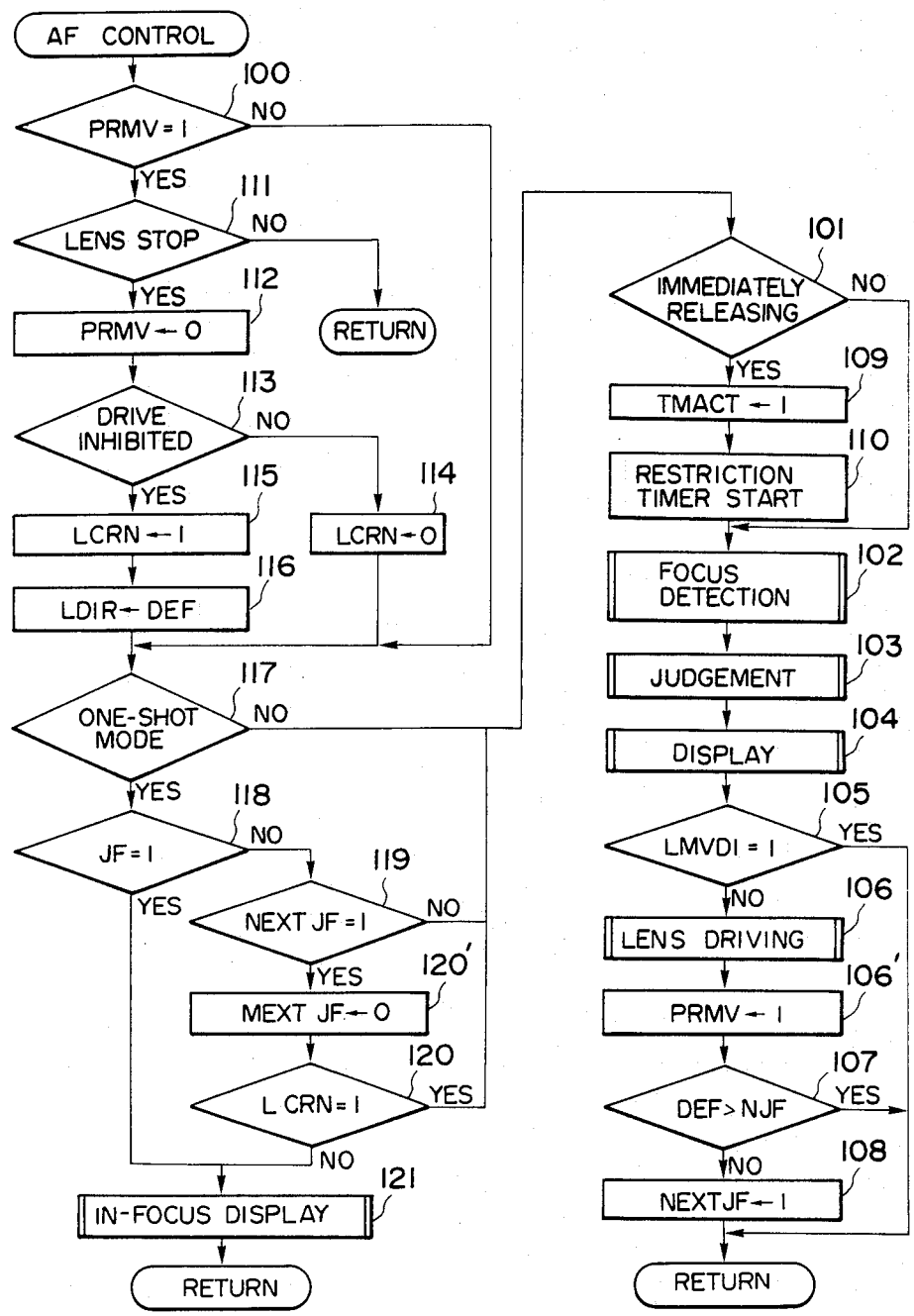

The step 4 is an automatic focusing subroutine (AF) shown in FIG. 4B.

In said automatic focusing (AF) control subroutine, a step 100 at first detects the set state of a flag PRMV. If said subroutine is executed for the first time, all the flags have been cleared to zero in the step 2, so that the sequence proceeds to a step 117.

The step 117 discriminates the automatic focusing mode, and the sequence proceeds to a step 101 in case of a servo mode, or to a step 118 in case of a one-shot mode.

In the following there will be explained the case of servo mode, in which the sequence proceeds to the step 101.

The step 101 discriminates whether the film advancing has been conducted in the AE control subroutine executed immediately before.

If the film advancing has been conducted in the AE control subroutine of the step 3 conducted immediately before, namely if said step 101 is executed for the first time after the preceding photographing operation, a step 109 sets a flag TMACT to "1", then a step 110 activates a lens drive limiting timer, and the sequence proceeds to a step 102. On the other hand, if the film advancing has not been conducted in the AE control subroutine in the step 3 executed immediately before, the sequence proceeds to the step 102 skipping the steps 109 and 110.

In the present example, there has been conducted the depression of the shutter button over the first stroke but not the film advancing in said AE control subroutine, so that the sequence proceeds to the step 102 skipping steps 109 and 110.

Figure 4C:
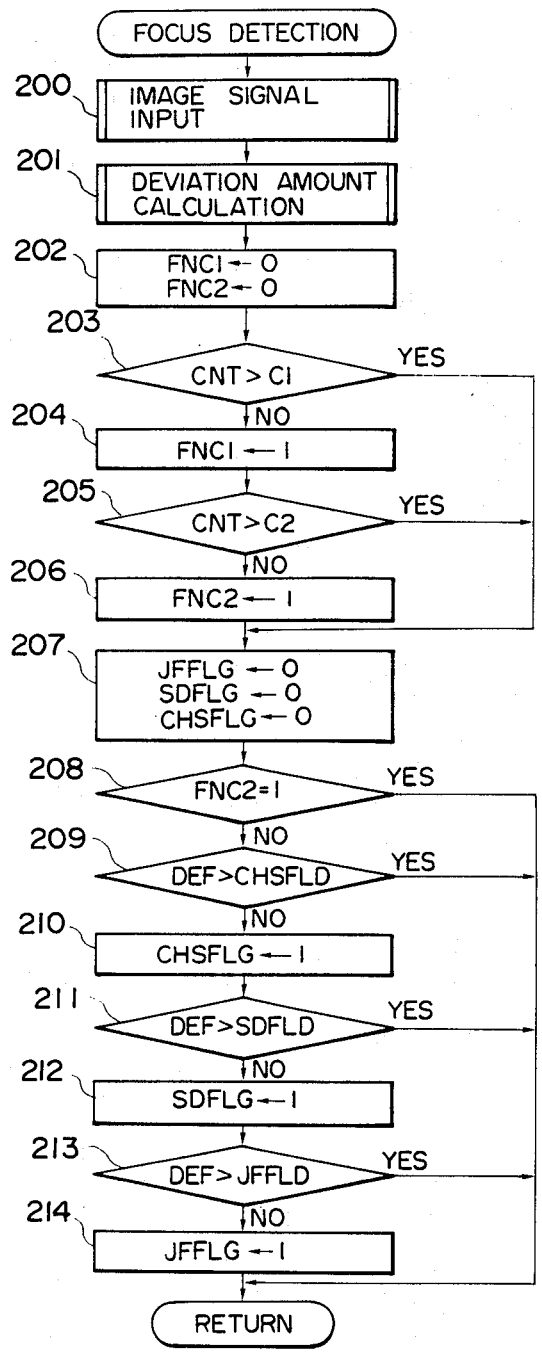

The step 102 is a focus detection subroutine shown in FIG. 4C, starting from a step 200. Said focus detection subroutine will be explained in the following.

The step 200 is an image signal input subroutine.

In said subroutine, the microprocessor PRS shifts the signal CSDR to the H-level to select the driving circuit SDR and supplies said driving circuit SDR with an accumulation start command as the SO signal, in response to which the driving circuit SDR transmits a signal CLR to the line sensor unit SNS thereby clearing the accumulated image signals therein and thereafter starting an image accumulation operation. The CCD line sensors CCD1, CCD2 of the line sensor unit SNS respectively receive light beams entering through the photographing lens, and the image positions on said CCD line sensors are determined according to the focus state. More specifically, if the lens is just focused to the object, a same image pattern is projected on the same position in the sensors CCD1, CCD2, but if the lens is focused to a point in front of or behind the object, the image patterns on said sensors CCD1 and CCD2 are symmetrically displaced according to the direction and amount of defocus. Consequently the direction and amount of defocus can be detected by measuring the direction and amount of displacement between the image patterns on the sensors CCD1 and CCD2.

After the above-mentioned clearing of the image signals, the image patterns projected on the positions corresponding to the focus state are charged for a predetermined period in the sensors CCD1, CCD2. Then the driving circuit SDR supplies the sensor unit SNS with a signal SH and clock signals $\phi1$, $\phi2$. The image charging period of said image patterns is determined, based on an output signal AGC of the charge control sensor in the sensor unit SNS.

The signal SH and the clock signals $\phi1$, $\phi2$ supplied to the sensor unit SNS cause said unit to release, from an output terminal thereof, image signals charged in the pixels of the sensors CCD1 and CCD2, as a time-sequential output signal OS, which is amplified by an amplifier in the driving circuit SDR to obtain a signal AOS serially supplied to the microprocessor PRS. Said signal AOS is converted, in succession, into digital values by an internal A/D converter and stored in the RAM.

In this manner the image signals corresponding to the image patterns on the sensors CCD1, CCD2 are stored in the RAM in the form of digital values. Thus the image signal input subroutine is completed and the sequence proceeds to a step 201.

The step 201 executes a defocus calculating subroutine, which calculates a defocus amount DEF indicating the amount of defocus from the focused position and the direction thereof, from the digital values corresponding to the image patterns on the sensors CCD1, CCD2 determined in the above-mentioned image signal input subroutine. The detailed method of calculation of said defocus amount will not be explained as it is not directly related to the present invention. In brief, however, as the degree of coincidence of the image patterns on the sensors CCD1, CCD2 is determined by the focus state, the defocus amount DEF indicating the amount and direction of defocus from the focused state can be obtained by calculating the degree of coincidence of the image patterns on said sensors, through the comparison of said digital values. This subroutine also determines, from the digital values corresponding to the image patterns on the sensors CCD1, CCD2, the contrast CRT in the known manner which will not be explained in detail.

A step 202 sets flags FNC1, FNC2 to zero. Said flags indicate the reliability of the focus detection. In the present embodiment the reliability is represented in three levels: a highest reliability level indicated by both flags at "0", a medium reliability level indicated by the FNC1="1" and FNC2="0", and a lowest reliability level indicated by FNC2="1".

A step 203 compares the contrast CNT determined in the above-explained step 201 with a constant value C1.

Then the sequence proceeds either to a step 207 in case of CNT>C1, or to a step 204 in case of CNT<C1.

The step 204 sets the flag FNC1 to "1", and the sequence proceeds to a step 205.

A step 205 compares said constant CNT with a constant value C2 smaller than the constant C1. Then the sequence proceeds either to a step 207 in case of CNT>C2, or to a step 206 in case of CNT<C2.

A step 206 sets the flag FNC2 to "1".

The above-explained steps 203 to 207 therefore set the flags FNC1, FNC2 to "0" when the contrast is very high; set said flags respectively to "1" and "0" in case of C1>CNT>C2, and set said flags to "1" in case of C2>CNT.

The step 207 is executed after the set state of the flags FNC1, FNC2 are determined by the foregoing steps.

The step 207 sets flags JFFLG, SDFLG and CHSFLG to "0", thus initializing these three flags.

A step 208 detects the state of the flag FNC2.

If the flag FNC2 is set to "1", the focus detection subroutine is terminated, and the sequence returns to the AF control routine and to the step 103 for the judgement subroutine. On the other hand, if the flag FNC2 is set to "0", the sequence proceeds to a step 209.

The step 209 compares the defocus amount DEF determined in the step 201 with a constant value CHSFLD, and, if the former is larger, the focus detection subroutine is terminated and the sequence returns to the AF control subroutine and proceeds to the step 103 for the judgement subroutine. Said constant CHSFLD is selected slightly larger than a defocus amount corresponding to a near focus state, so that a condition DEF>CHSFLD indicates that the amount of defocus from the focused state is large.

On the other hand, if the foregoing comparison turns out as CHSFLD≧DEF, the sequence proceeds to a step 210.

The step 210 sets said flag CHSFLG to "1".

In this manner the flag CHSFLG is set to "1" if the amount of defocus does not exceed the constant CHSFLD, namely if said amount is not so large.

A step 211 compares said defocus amount DEF with a constant SDFLD, and, if the former is larger, the sequence proceeds to the step 103 for the judgement subroutine. Said constant SDFLD is selected smaller than the aforementioned constant CHSFLD, and corresponds to a defocus amount corresponding to a near focus state.

If said comparison turns out as SDFLD≧DEF, a step 212 is executed to set said flag SDFLD to "1". In this manner the flag SDFLG is set at "1" when the defocus amount DEF indicates a near focus state.

A step 213 compares the defocus amount DEF with a constant JFFLD, and, if the former is larger, the focus detection subroutine is terminated and the sequence returns to the AF control subroutine and proceeds to the step 103 for the judgement subroutine. Said constant JFFLD is selected smaller than SDFLD and is of a value that can be regarded as a focused state.

On the other hand, if said comparison turns out as JFFLD≧DEF, a step 214 sets a flag JFFLG to "1" and the sequence moves the step 103 for the judgement subroutine.

In this manner the focus detection subroutine sets the flags FNC1, FNC2 according to the reliability of the focus detection. Except when the flag FNC2 is set at "1" indicating a low contrast situation of very low reliability, the flag JFFLG, SDFLG or CHSFLG is set to "1" respectively in a focused state, a near focus state or a somewhat larger defocus state, according to the defocus amount DEF.

After the completion of said focus detection subroutine, the sequence returns to the AF control subroutine, and the judgement subroutine of the step 103 is executed.

Figure 4D:
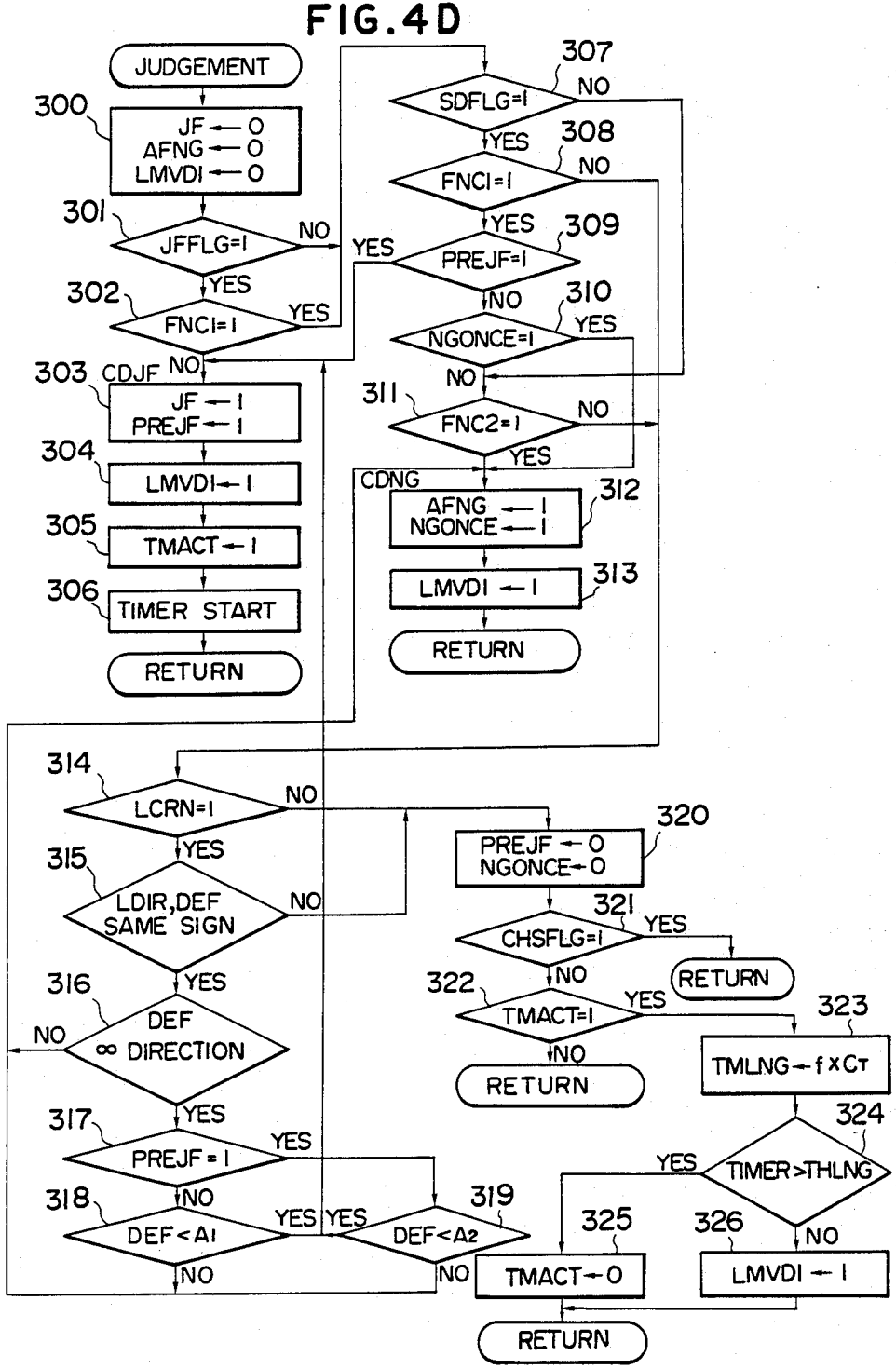

Said judgement subroutine is shown in FIG. 4D, and starts from a step 300.

The step 300 sets flags JF, AFNG and LMVDI to "0", thus initializing these flags.

A step 301 then detects the set state of the aforementioned flag JFFLG, and the sequence proceeds either to a step 302 in case the flag JFFLG is "1", or to a step 307 in case the flag JFFLG is "0".

It is now assumed that the flag JFFLG is set at "1". In this case the step 302 detects the flag FNC1, and the sequence proceeds to a step 303 in case of FNC1=0 or to a step 307 in case of FNC1=1.

Thus the focus detecting operation is conducted under a high contrast condition if the result of focus detection shows a focused state, and the step 303 and the subsequent steps are executed only when the result of detection is highly reliable.

If the sequence proceeds to the step 303 as explained above, it sets a just-focus flag JF and a flag PREJF to "1", and the sequence proceeds to subsequent steps.

A step 304 sets a flag LMVDI to "1".

A step 305 sets a flag TMNCT to "1".

A step 306 activates a lens drive limiting timer. Then the judgement subroutine in a focused state is terminated, and the sequence returns to the AF control subroutine for starting a display subroutine in a step 104.

In the foregoing there have been explained the operation when the focused state is identified under a high reliability situations. In other situation either the flag JFFLG is set at "0", or the flag FNC1 is set at "1". Thus the step 301 or 302 detects such set state whereby the sequence proceeds to a step 307 and subsequent steps.

The step 307 detects the state of the flag SDFLG, and the sequence proceeds either to a step 311 or a step 308, respectively when the flag SDFLG is "0" or "1". As the flag SDFG is set at "1" if the focus detecting operation identifies a near focus state, the step 308 is executed when the focusing is close to the focused state.

The step 308 detects the set state of the flag FNC1, and the sequence proceeds to a step 314 or 309 respectively if the flag FNC1 is "0" or "1". In the following there will be explained a case in which the sequence proceeds to the step 309 by the setting of the flag FNC1 to "1".

The step 309 detects the state of the flag PREJF. It is set to "1" when the step 303 is executed, or, when a focused state is identified in the preceding focus detecting operation. However it is reset to "0" by the flag clearing operation of the step 2 before the first focus detecting operation, so that it is in a state "0" at the first execution of the judgement subroutine. In the present case, since the judgement subroutine is executed for the first time, the sequence proceeds to the step 310.

The step 310 detects the state of a flag NGONCE, which is set to "1" when a focus detection disabled state is identified in the preceding focus detecting operation.

This flag is at "0" at the initial execution of the judgement subroutine, so that the sequence proceeds to the step 311.

The step 311 detects the set state of the flag FNC2. Said flag FNC2 is set to "1" under a very low contrast situation as explained above, so that the sequence proceeds to a step 312 and ensuing steps when the focus detection is conducted under a very low contrast.

In the initial focus detection the sequence proceeds from the step 311 to the step 312 only if the contrast is very low, and, in other cases the sequence proceeds to a step 314 or 303.

A step 312 sets the focus detection disabled flag AFNG and a flag NGONCE to "1", and a step 313 sets a flag LMVDI to "1" to terminate the judgement subroutine. Thus, only if the first focus detection is conducted under a very low contrast, the steps 312, 313 are executed to set the focus detection disabled flag AFNG to "1".

As will be apparent from the foregoing explanation, in the first focus detecting operation, the just-focus flag JF is set to "1" only when the reliability of focus detection is highest and when a focused state is detected, while the focus detection disabled flag AFNG is set to "1" only when the reliability is lowest, and, in any other case the step 314 and the succeeding steps are executed. However, if the focus detection is executed before, the following flow is conducted in consideration of the result of the preceding focus detection.

In the course of execution of a series of steps of the judgement subroutine explained above, the step 309 detects the set state of a flag PREJF, and, if in a state "1", the sequence proceeds to the step 303. As explained before, said flag PREJF is set at "1" if the step 303 is executed before, or namely if a focused state is detected in the preceding focus detection. Therefore, even when the new focus detection detects a near focus state and the reliability is not high, the sequence proceeds to the following steps to set the just-focus flag JF at "1" if a focused state is detected in the preceding focus detecting operation.

On the other hand, when the new focus detecting operation detects a near focus state and the reliability is not high, the step 310 detects the flag NGONCE at "1" if the preceding focus detecting operation identified the focus detection disabled state, so that the sequence proceeds to the step 312 to set the focus detection disabled flag AFNG at "1".

The following Table 1 summarizes the conditions whereby the judgement subroutine is completed by said steps 300-312 after setting the flags JF and AFNG at "1".

TABLE 1

| | | |
|---|---|---|
| JF=1 | First focus detection, and second or subsequent focus detection at PREJF=0 | Second or subsequent focus detection at PREJF=1 |
| | JFFLG=1 and FNC1=0 (focused state with high reliability) | Condition shown left, or SDFLG=1, FNC1=1 and PREJF=1 (close to focused state with a non-high reliability and with preceding detection of focused state) |
| AFNG=1 | First focus detection, and second or subsequent focus detection at NGONCE=0 | Second or subsequent focus detection at NGONCE=1 |
| | FNC2=1 (lowest reliability) | Condition shown left, or SDFLG=1, FNC1=1 and |

TABLE 1-continued

NGONCE=1 (close to focused state with a non-high reliability and with preceding disabled focus detection)

As explained in the foregoing, the flag JF or AFNG is set to "1" even when a near focus state is detected in the new focus detecting operation if the reliability is not high. This is in consideration of a fact that a lens drive based on the result of new focus detection may not be able to bring the lens to the focused position since the reliability of said detection is not high, and a focused state or a focus detection disabled state, if identified in the preceding focus detecting operation, may be adopted as a correct result for the new focus detecting operation.

Also if the lens is moved according to the result of a new focus detecting operation, the focused state or the focus detection disabled state, identified in the preceding focus detection, is cancelled in the new focus detecting operation of a lower reliability. Therefore the identification of the focused state or focus detection disabled state may vary at every focus detecting operation and will not be stable. Therefore a display of such focused state or focus detection disabled state, if given as will be explained later, may unstably change during the lens drive, thus confusing the user of the camera or resulting in a continuing movement of the lens, and the above-explained procedure is adopted for preventing such phenomena. According to the present invention, after the focused state or the focus detection disabled state is once identified, any different result of the succeeding focus detecting operation is disregarded if the reliability of said operation is not high and the result of preceding identification is adopted.

In the following there will be explained a case where the proceeding to a step 314 is permitted after the above-explained steps 300 to 313.

Said step 314 is executed in situations other than those indicated in Tab. 1, namely other than the focused state or the focus detection disabled state.

The step 314 detects the set state of a flag LCRN.

Said flag LCRN is set to "1", as will be explained later, when the lens is moved to a mechanical limit position corresponding to the infinite object position or the closest object position and cannot be moved further, and the sequence proceeds to a step 320 or 315 respectively if said flag LCRN is "0" or "1". Now it is assumed that the lens is at such a limit position, so that the step 315 is executed.

The step 315 determines the signs of the content of a memory LDIR and of the defocus amount DEF obtained in the focus detecting operation. The memory LDIR stores the defocus amount obtained in the preceding focus detecting operation. As explained before, the defocus amount DEF indicates the amount and direction of defocus, and the sign of said defocus amount is determined by the direction in which the lens is to be driven.

If the sign of the preceding defocus amount in the memory LDIR is different from that of the new defocus amount, the sequence proceeds to the step 320 since the lens drive is possible However, if said signs are mutually the same, the sequence proceeds to a step 316 since further lens movement is not possible. It is now assumed that the sequence has proceeded to the step 316.

The step 316 detects whether the sign of the defocus amount DEF indicates a lens movement toward a position corresponding to the infinite object distance or a position corresponding to the closest object distance, and the sequence respectively proceeds to a step 317 or a step 312.

When the lens is located at the limit position corresponding to the closes object distance, if a further lens movement is commanded toward the direction corresponding to the closest object distance, the sequence proceeds to step 312 to execute the setting of the flag AFNG etc. in the steps 312 and 313, thereby terminating the judgement subroutine. In this manner such a situation is regarded as a focus detection disabled state since the focused state cannot be reached, and the process after the focus detecting operation is conducted.

On the other hand, when the lens is located at the limit position at the infinite object side, if a further lens movement is commanded toward said side, a step 317 is executed to detect the set state of the flag PREJF, and the sequence proceeds to a step 319 if the flag PREJF is "1" indicating the identification of the focused state in the preceding focus detecting operation, or to a step 318 if the flag PREJF is "0" indicating the absence of identification of the focused state in said operation.

It is now assumed that the sequence has proceeded to the step 318.

The step 318 compares the defocus amount DEF with a constant A1, and the sequence proceeds to a step 303 or 312, respectively if the former is smaller or larger than the latter.

In this manner, if the defocus amount is smaller than the constant A1 the step 303 executes a process the same as in the focused state, but, if the defocus amount is larger, the step 312 executes a process the same as in the focus detection disabled state.

Even when the real focused state is not reached at a lens position corresponding to the infinite object distance, if the defocus amount is small enough within a predetermined limit, such a situation may be regarded as a focused state in consideration of the lens characteristics, and the process for the focused state starting from the step 303 is executed. On the other hand, if said defocus amount exceeds said predetermined value, the focused state cannot be reached and such a situation cannot be regarded as the focused state, so that the sequence proceeds to the step 312 to execute the process for the focus detection disabled state.

On the other hand, if the step 317 detects that the flag PREJF is "1", indicating the identification of the focused state in the preceding focus detecting operation, a step 319 is executed to compare the defocus amount DEF with a constant A2, as in the step 318. The sequence then proceeds either to the step 303 to execute a process for the focused state in case of DEF<A2, or to the step 312 to execute a process for the focus detection disabled state in case of DEF>A2.

Said constant A2 is selected larger than the constant A1. The constants A1, A2 are made mutually different, because the probability of identifying the focused state is higher if the focused state has been identified in the preceding focus detecting operation, so that the limit of focused state may be selected larger than in a case where a non-focused state was identified in the preceding focus detecting operation. Said selection also has the purpose of stabilizing the identification of the focused state after it is identified once, as explained before.

Also said constant A1 is selected larger than the defocus amount JFFLD for identifying the focused state.

In this manner the constant A1 is selected larger than JFFLD to increase the limit defocus amount for identifying the focused state at the lens position corresponding to the infinite object distance, because a somewhat larger defocus amount may be regarded as the focused state, in consideration of the lens characteristics at such lens position. In this manner it is rendered possible to elevate the probability of reaching the focused state and to achieve the detection of the focused state within a shorter time.

The above-explained steps 315 to 318 correspond to a case in which the flag LCRN is set to "1", and the lens driving direction commanded by the new focus detecting operation is the same as that in the preceding focus detecting direction, so that the lens can no longer be driven according to the result of the focus detecting operation. The sequence will proceed to the step 320 in other cases, namely when the lens movement is possible according to the result of the focus detecting operation and at the first focus detecting operation even if the lens is at a limit position and is instructed to move beyond said limit position according to the result of said focus detecting operation.

The step 320 sets the flags PREJF and NGONCE to "0".

Then a step 321 detects the state of a flag CHSFLG.

The judgement subroutine is terminated if the flag CHSFLG is set to "1", namely when the steps 209, 210 identify that the defocus amount determined in the focus detecting operation is smaller than said constant CHSFLD.

On the other hand a step 322 is executed when the flag CHSFLG is set at "0" indicating a large defocus amount.

The step 322 detects the set state of a flag TMACT, and the judgement subroutine is terminated if said flag TMACT is "0", while the sequence proceeds to a step 323 if said flag is "1".

Said flag TMACT is set to "1" in a step 109 to be explained later or the aforementioned step 305, namely only during a focus detecting operation after a photographing operation, or in the steps 305 and 06 after the identification of a focused state.

Consequently the judgement subroutine is immediately terminated if the photographing operation has not been conducted or if a focused state has not been identified in the foregoing focus detecting operation, and the sequence proceeds to a step 323 if a focused state is identified in the course of the focus detecting operation after a photographing operation or in a focus detecting operation.

In the following there will be explained a case in which a focused state was identified before and the defocus amount was identified in a subsequent focus detecting operation larger than said flag CHSFLG.

In such case the step 322 detects the state "1" of the flag TMACT, so that the sequence proceeds to a step 323 for multiplying the focal length f of the lens with a constant $C_T$ to obtain a product $f \times C_T$ for setting as a time MTAMLNG of a timer, and the sequence then proceeds to a step 324.

The step 324 compares the time TMLNG with elapsed from the start of the lens drive limiting timer in the step 306 after the detection of the focused state. In case the elapsed time is longer than TMLNG, namely in case said time TMLNG has expired after the detection of the focused state, a step 325 is executed to reset the flag TMACT to zero. On the other hand, in case TMLNG is longer than the elapsed time, namely said time TMLNG has not elapsed after the detection of the focused state, a step 326 is executed to set LMVDI to "1" and the judgement subroutine is terminated.

In the lens driving operation in the above-explained steps 320–326 according to the amount of defocus detected in the focus detecting operation, if said defocus amount is smaller than CHSFLD, the lens drive is conducted in a step 106 to be explained later, immediately after the judgement subroutine and in response to said defocus amount. In addition, if the defocus amount, obtained in a focus detecting operation without a preceding detection of the focused state or without a photographing operation, is larger than the CHSFLD, the lens drive is conducted in the step 106 immediately after the judgement subroutine and in response to said defocus amount.

Consequently there is always conducted a lens drive based on the calculated defocus amount when a large defocus is detected in a focus detecting operation without a detection of the focused state in a preceding focus detecting operation, or when a small defocus is detected in a focus detecting operation. On the other hand, when a photographing operation is conducted before or when the focused state is detected in a prior focus detecting operation, the lens driving operation is prohibited during the above-mentioned period TMLNG after said photographing operation or said detection of the focused state, and is started, after the lapse of said period, in response to the calculated defocus amount. In the following there is explained the reason for delaying the lens drive until the lapse of said period in case a large defocus is detected in a focus detecting operation after a detection of the focused state.

Detection of a large defocus in a focus, detecting operation after the detection of the focused state will arise from a fact that the lens is directed to an object different from the object when the focused state was detected. Such a situation may result when the viewing field for focusing of the camera is deflected from the desired object for example by a vibration of the camera. In such case, the lens, if immediately driven according to the result of the focus detecting operation, will be focused on an object different from the desired object, so that it becomes necessary to effect a focus detecting operation by holding the desired object in said viewing field again and to bring the lens to the focused state on said desired object.

The above-explained drawback is prevented in the present invention by prohibiting the lens driving operation for a predetermined period in case of detection of a large defocus after a detection of focused state. Thus the user can return the viewing field to the desired object within said period even if it is deflected from said desired object by a vibration, and the lens is prevented from movement resulting from such vibration. Since such vibration tends to occur more easily when the lens has a longer focal length, and, for this reason, said period TMLNG is selected longer according to the focal length f of the lens. Said focal length f is stored in advance in the microprocessor PRS, at the calculation of the defocus amount in the step 201 of the focus detection subroutine, by shifting the signal CLCM from the microprocessor PRS to the H-level, transmitting a signal SO to the communication buffer circuit LCM to transmit a corresponding buffered signal DCL to the control circuit LPRS for reading various lens parameters including said focal length, and transmitting said parameters to the microprocessor through the signals DLC and SI.

On the other hand, in response to a small defocus, the lens is driven immediately without waiting for said period TMLNG, because such small defocus generally arises from the movement of the object which is maintained in said viewing field, and such lens drive arrows to follow the object movement.

For the same reason, the lens driving operation is started after the lapse of the timer period TMLNG also in case of detection of a large defocus after a photographic operation.

The functions of the above-explained judgement subroutine can be summarized as follows:

(1) Detection of the focused state: as shown in Tab. 1;

(2) Detection of the focus detection disabled state: as shown in Tab. 1;

(3) The case of lens drive impossible:

(a) If the lens is at a limit position corresponding to the closest object distance and if a lens movement beyond said limit position is commanded, a focus detection disabled state is identified;

(b) If the lens is at a limit position corresponding to the infinite object distance and if a lens movement beyond said position is commanded, a focused state is identified when a focused state was identified previously and under a condition that the defocus amount does not exceed A2, but a focus detection disabled state is identified otherwise.

In the absence of previous identification of the focused state, a focused state is identified under a condition that the defocus amount does not exceed A1 (A2->A1>JFFLD), but a focus detection disabled state is identified otherwise.

(4) In cases; other than (1), (2) or (3), (a) The lens is immediately driven in response to the defocus amount when it is smaller than CHSFLD.

(b) When the defocus amount is equal to or larger than CHSFLD:

(b)-1 Within a predetermined period (TMLNG) from a previous identification of the focused state of from a photographing operation, the lens driving operation in response to said defocus amount is conducted after the lapse of said period.

(b)-2 In cases other than (b)-1, the lens drive is immediately conducted in response to the defocus amount.

After the termination of the judgement subroutine, the sequence returns to the AF control routine, and proceeds to a step 104 for a display subroutine. If a judgement subroutine result flag JFFLG is set to "1", indicating a focused state, the microprocessor PRS shifts, in the display subroutine, a signal CDDR to the H-level to select the display circuit DDR, and transmits the information of said flag JFFLG as the signal SO to said circuit DDR whereby said circuit DDR turns on a LED in the display unit DSP for indicating the focused state.

On the other hand, if the flag AFNG is set to "1" indicating a focus detection disabled state, the information of said flag AFNG is likewise transmitted to said circuit DDR to turn on a LED, thereby informing, the user that focus detection is not possible.

After said display subroutine, the sequence proceeds to a step 105.

The step 105 detects the set state of the flag LMVDI.

Said flag is set to "1" only in the steps 304, 313 or 326 of the judgement subroutine, corresponding to a focused state, a focus detection disabled state or the lapse of said timer period TMLNG.

In any of these situations, the AF control subroutine is terminated and the sequence returns to the step 1 without executing the lens driving subroutine to be explained later. In any other situation the sequence proceeds to a step 106 for executing the lens drive subroutine.

In said lens drive subroutine, the microprocessor PRS shifts the signal CLCM to the H-level, thus designating the circuit LCM.

The defocus amount is transmitted as the signal SO to said circuit LCM, and then, as the signal DCL to the control circuit LPRS. After the transmission of the defocus amount in the step 106 to the circuit LPRS, it shifts the signal LMF or LMR to the H-level according to said defocus amount, thereby driving the motor LMTR in a direction determined by said defocus amount and axially displacing the photographing lens LNS. The amount of lens movement is monitored by the encoder ENC which generates a signal SENC corresponding to the amount of movement. Said signal SENC is compared with the aforementioned signal representing the defocus amount and transmitted to the circuit LPRS, and, at the coincidence of these two signals, the signals LMF, LMR are shifted to the L-level to terminate the rotation of the motor LMTR, thereby terminating the lens drive.

After the start of lens drive in the step 106, a step 106' sets a flag PRMV indicating that the lens has been moved, and the sequence proceeds to a step 107.

The step 107 compares the defocus amount with a constant value NJF, and the AF control subroutine is terminated in case of DEF>NJF. In case of DEF<NJF, a step 108 sets a flag NEXTJF to "1", and the AF control subroutine is terminated.

Said constant NJF is selected at a level of defocus that can be regarded as a near focus state.

Consequently if the defocus amount can be regarded as a near focus state, the flag NEXJF is set to "1" and the AF control subroutine is terminated.

In this manner a series of AE and AF controls is conducted by the foregoing steps.

For the purpose of clarity, the foregoing explanation on the function control is summarized in the following description.

At the first photographing operation, when the power switch is turned on and the shutter button is depressed over the first stroke, there is conducted the AE control for light metering and data processing. Thereafter the AF control is conducted.

At the first photographing operation, the focus detecting operation and the judgement subroutine are executed, to identify the focus state. If the focused state is identified in the first focus detecting operation, there is given a corresponding display, and the AE and AF controls mentioned above are repeated as long as the shutter button is maintained in the depressed state over the first stroke to keep the switch SW1 closed.

If a focus detection disabled state is identified in the first focus detecting operation, there is given a corresponding display, and the AE and AF controls are repeated as long as the switch SW1 is kept closed.

If the first focus detecting operation does not identify a focused state nor a focus detection disabled state, the lens is driven in response to the detected defocus amount.

The above-explained functions are made in response to the result of the first focus detecting operation. In the following there will be explained subsequent functions.

At first there will be explained a case in which a focused state is identified in the first focus detection. In this case the display of the focused state is maintained as long as the focused state is still identified in the second and subsequent focus detecting operations. Said display is also maintained when a near focus state is identified without high reliability in said second and subsequent operations. Stated differently, said display of the focused state is maintained as long as the second and subsequent focus detecting operations identify either a focused state or a near focus state without high reliability.

When the focus detecting operation while the display of focused state is given identifies either a focused state, or a near focus state without high reliability, or a state other than the focus detection disabled state, the lens is immediately driven in response to the defocus amount if said defocus amount does not exceed the CHSFLD. On the other hand, if the defocus amount is equal to or larger than the CHSFLD, the lens is driven in response to said defocus amount after the lapse of a period determined as a function of the focal length of the lens.

In the following there will be explained the function when a focus detection disabled state is identified in the first focus detecting operation. The display of the focus detection disabled state is maintained when the second and subsequent focus detecting operations continue to identify the focus detection disabled state, or to identify a near focus state without high reliability.

On the other hand, if the repeated focus detecting operations identify either a focused state or a state other than the focus detection disabled state or the near focus state without high reliability, the lens is immediately driven in response to the detected defocus amount.

In the following there will be explained the function after a lens driving operation is conducted in response to the result of the first focus detecting operation.

In this case, after the lens driving operation is initiated by the step 106, the steps 106' to 108 are executed, then the sequence proceeds to the AE subroutine for light metering and data processing, and then the AF control subroutine is executed again. Since the lens was driven according to the result of the preceding focus detecting operation, the flag PRMV is set to "1" in the step 106', so that the step 100 in the repeated AF control subroutine detects said state "1" of the flag PRMV whereby the sequence proceeds to a step 111.

Said step 111 and subsequent steps are executed only when the lens was already driven according to the defocus amount determined before.

The step 111 detects whether the lens is in a stopped state. Said detection is achieved by shifting the CLCM from the microprocessor PRS to the H-level to select the circuit LCM, and supplying said circuit LCM with a signal SO which is transmitted as a signal DCL to the control circuit LPRS.

Said SO signal is a lens stopping detection command, in response to which the circuit LPRS detects the monitor signal SENC from the encoder ENC. Said monitor signal SENC is generated during the movement of the lens, and the circuit LPRS detects the presence or absence of said monitor signal and sends a signal DLC, indicating the result of said detection, to the circuit LCM, which relays said signal DLC as the signal SI to the microprocessor PRS.

The step 111 thus discriminates whether said monitor signal is generated, and, in the presence of the monitor signal indicating that the lens is still being driven in response to the previous defocus amount, the AF control subroutine is terminated. Consequently, as long as the lens is in the driven state, the step 111 in the AF control subroutine repeats the detection whether the lens has been stopped.

When the lens is stopped after a drive corresponding to the defocus amount in the course of the repeated detections, the sequence then proceeds to a step 112 for resetting the flag PRMV to "0", and to a step 113 for discriminating whether the lens has been stopped after a drive corresponding to the defocus amount, or it has reached a limit position and has therefore been stopped.

Said discrimination is conducted by the signal SENC as in the foregoing detection of the lens stopping. More specifically the step 113 compares the signal SENC indicating the amount of lens movement and the defocus amount, and, if the former is smaller, identifies that the lens has been stopped as it has become no longer movable.

If said step 113 detects that the lens has been properly driven corresponding to the defocus amount, a step 114 resets the flag LCRN to "0" and the sequence proceeds to a step 117. On the other hand, if the lens is identified to be no longer movable, a step 115 sets the flag LCRN to "1", then a step 116 stores the previously detected defocus amount DEF in the memory LDIR and the sequence proceeds to the step 117.

The step 117 detects the automatic focusing mode, by shifting a signal CDDR from the microprocessor PRS to the H-level to select the circuit DDR, and by receiving a signal SI indicating the set state of a mode selection switch in the input switch unit SWS, thereby identifying the state of said mode selection switch.

It is now assumed that the servo mode is selected by the mode selection switch. In this case the step 101 and the subsequent steps are executed again.

As explained in the foregoing, when a lens driving operation is conducted according to the result of the first focus detecting operation, there are detected (1) whether the lens has been stopped and (2) whether the lens has become undrivable, and the operation starting from the step 101 is executed again. Consequently the focus detecting operation is conducted after the lens driving operation, and a display for the focused state is given if the lens has been moved to the focused state in said lens driving operation. On the other hand a display for the focus detection disabled state is given if such a state is identified, and, if the focused state or the focus detection disabled state is not found, a lens driving operation is conducted according to the calculated defocus amount.

The above-explained procedure is repeated until the focused state is reached.

Also the above-mentioned AF control procedure is repeated even after the focused state is reached, so that the lens can be moved to the focused position, following the eventual movement of the object. In such case, since the lens was once moved to the focused state before, the lens driving operation is conducted after the lapse of the aforementioned period TMLNG.

The foregoing description applies to a case in which the lens is driven according to the result of the first focus detecting operation in the servo mode. Even after the lens has been moved for focusing on the object which has moved after the detection of a focused state or a focus detection disabled state in the first focus detecting operation, a similar operation is continued to maintain the lens constantly in the focused state.

On the other hand, if the lens has been driven to a limit position in the above-explained lens driving operation, so that the LCRN has been set to "1" in the step 115, the aforementioned steps 315 to 319 are executed in the subsequent judgement subroutine. Therefore, if the previous lens driving operation has brought the lens to a limit position corresponding to the closest object distance or the infinite object distance and a driving operation beyond said position is commanded in the new focus detecting operation, and if the defocus amount in such a state is equal to or larger than the constant A1 or A2, there is executed a procedure for the focus detection disabled state, and the lens drive according to the result of new focus detecting operation is prohibited.

Similarly, if the previous lens driving operation has brought the lens to a limit position corresponding to the infinite object distance and a driving operation beyond said position is commanded in the new focus detecting operation, and if the defocus amount in such state is smaller than the constant A1 or A2, there is executed a procedure for the focused state, and the lens drive according to the result of new focus detecting operation is again prohibited.

In the following there will be explained the process in case the one-shot mode is identified by the step 117.

The functions in the one-shot mode are the same as those in the servo mode, from the start of power supply to the lens driving operation based on the calculated defocus mode.

More specifically, also in the one-shot mode, a focus detecting operation is conducted to determine the defocus amount, and the lens is driven according to said defocus amount.

In the AF control subroutine after said lens driving operation, the steps 111–116 are executed at first and the steps 117, 118 are then executed. In this case the flag JF is not set at "1" since the lens driving operation has been conducted, so that the sequence proceeds to a step 119 for detecting the state of the flag NEXTJF, which is set to "0" or "1" respectively when the defocus amount in the preceding lens driving operation is larger or smaller than a constant NJF.

Thus, when the preceding focus detecting operation has identified a large defocus amount, the step 101 and the subsequent steps are executed, and, after the lens driving operation, the focus detecting operation is repeated to identify whether the lens has been brought to the focused position by said driving operation.

If a focused state is identified in said repeated focus detecting operation, the flag JF is set to "1". Thus, in the AF control subroutine after said repeated focus detecting operation, the step 118 detects said setting of the JF flag, whereby the sequence proceeds to the step 121 for executing the focused state display subroutine, thus displaying the focused state. In the one-shot mode, when the focused state is once detected, the sequence proceeds from the step 118 to the step 121, so that the focus detecting operation and the lens driving operation are thereafter prohibited.

On the other hand, if the focused state is not identified in the repeated focus detecting operation after the initial lens driving operation, the lens is driven according to the defocus amount calculated again, and this procedure is repeated until the focused state is reached. After the focused state is reached, there are prohibited the focus detecting operation and the lens driving operation.

In the foregoing there has been explained a case of detection of a large defocus in the initial lens driving operation. On the other hand, in case of detection of a small defocus, the step 119 detects the state "1" of the flag NEXTJF whereby the sequence proceeds to the steps 120', 120 and 121.

Therefore, in the one-shot mode, if the defocus amount after the lens drive is smaller, namely if the lens has been driven from a near focus position toward the focused position, the sequence proceeds to the step 121 without repeating the focus detecting operation unless the lens is in an undrivable state. Thus a display of the focused state is given, and the focus detecting operation is thereafter prohibited. The step 121 sets the flag JF to "1" and provides the display of the focused state.

In this manner, in the one-shot mode, if the preceding defocus amount is less than a predetermined value and the lens has been moved from a near focus position toward the focused position, the lens is regarded to have reached the focused position and the display of focused state is given without confirmation of the focused state by repeating the focus detecting operation, and it is rendered possible to reduce the time required to arrive at the focused state in the one-shot mode.

Even when the steps 119, 120' and 120 are executed in response to the detection of a small defocus in the one-shot mode, if the flag LCRN is set to "1" indicating that the lens is stopped at the limit position by the lens driving operation, the sequence does not proceed to the step 121 but to the step 101 to repeat the focus detecting operation. In this manner it is confirmed whether the lens has been stopped at the limit position before reaching the focused position, and, upon confirmation of the presence of the lens at the focused position, a display of the focused state is given. In any other case the above-mentioned focus detecting operation is repeated until the lens is finally brought to the focused position.

As explained in the foregoing, in the one-shot mode, the lens is regarded to have reached the focused position in case of a lens driving operation corresponding to a small defocus amount, so that the AF control subroutine is terminated without repeating the focus detecting operation after the lens driving. However the focus detecting operation is repeated only when the lens has been stopped at a limit position. Consequently the lens movement for a small defocus amount may be regarded as a movement to the focus position, and still the lens is not deviated from the focus state and can be surely brought to the focused state.

In the foregoing embodiment the step 305 for setting the flag TMACT and the step 306 for starting the timer are executed in response to the detection of the focused state, but it is also possible to insert these steps between the steps 321 and 322 to replace the steps 320 and 322 and the YES branch of the step 321, to discriminate, after the step 321, whether the flag PREJF has been set to "1", and, if set, to executes the inserted steps. In this manner it is rendered possible to prohibit the lens movement during the lapse of a predetermined period from a large change in the defocus amount after the focused state is reached, thus achieving an effect similar to the case of starting the timer after the focused state is reached.

Also in the foregoing embodiment the timer is started when the focused state is reached, but it is also possible to start the timer when a near focus state is reached.

Figure 5A:
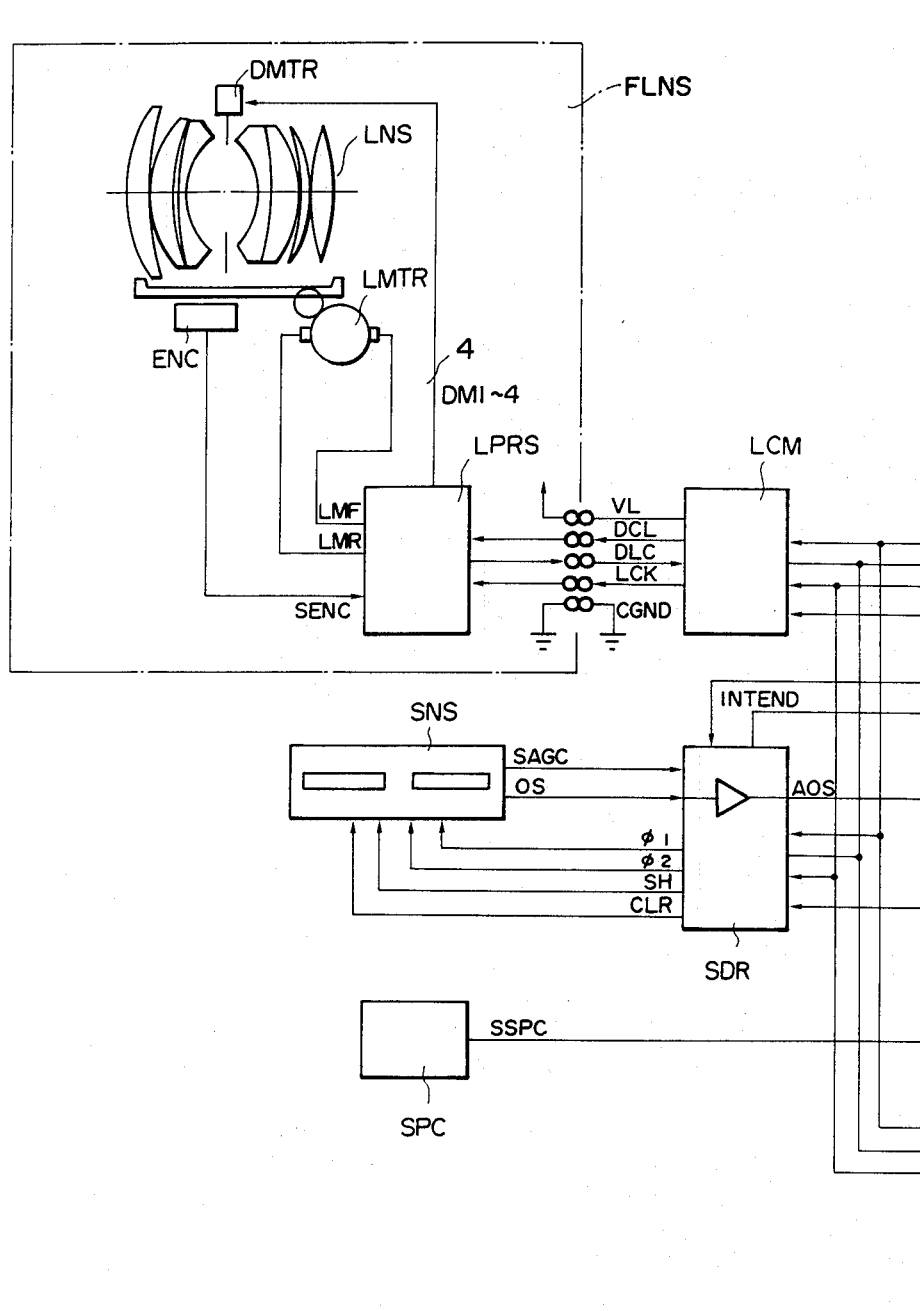
FIG. 5 is a circuit diagram of another embodiment of a camera having an automatic focusing device of the present invention.
Figure 5B:
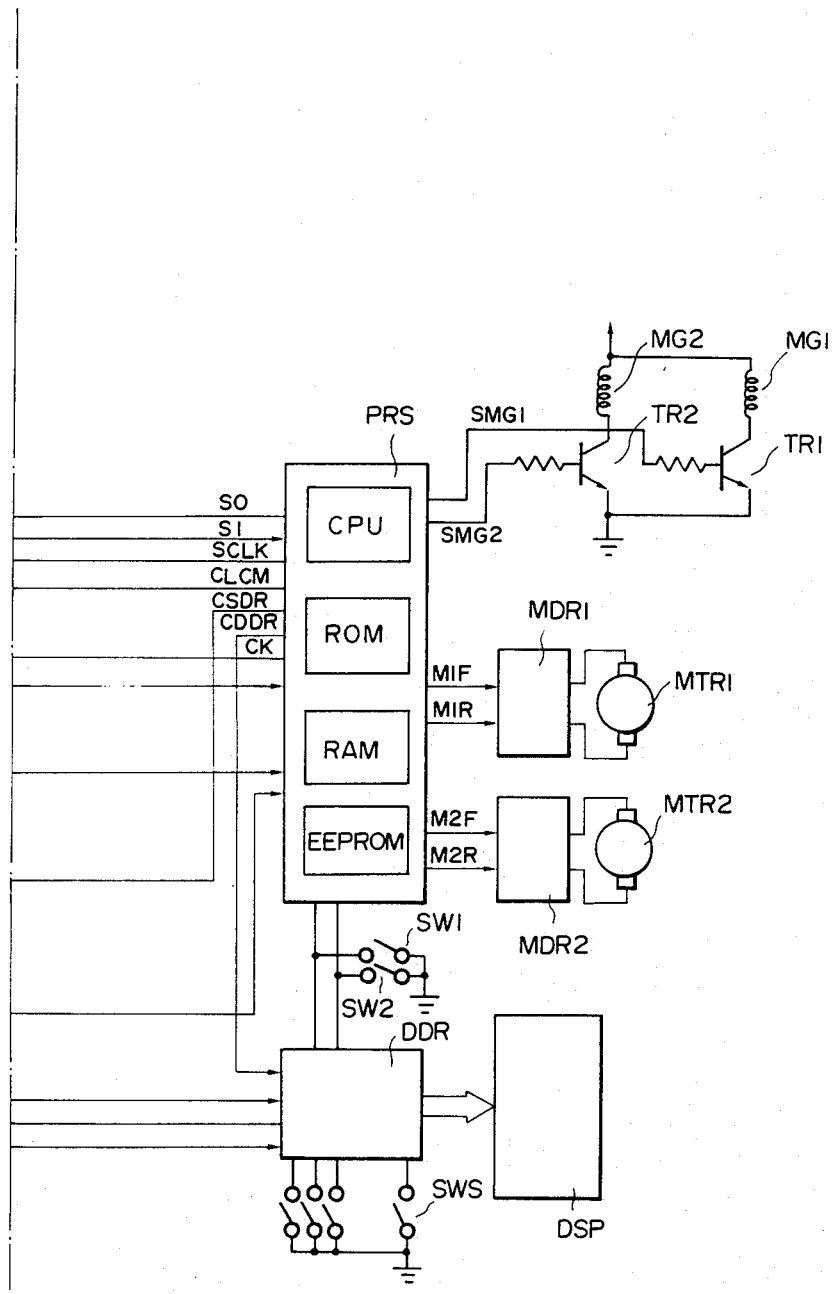

FIG. 5 is a circuit diagram showing another embodiment of the automatic focusing device of the present invention, wherein the same components as those in FIG. 3 are represented by the same symbols. The embodiment shown in FIG. 5 is different from that in FIG. 3 in the presence of a line for transmitting a signal INTEND, indicating the completion of the accumulating operation of the sensor unit SNS, from the circuit SDR to the microprocessor PRS.

Said embodiment is further capable of so-called search function, of driving the lens from the closest distance position to the infinite distance position on the focusing ring in case of a low contrast condition, thus detecting an object with a high contrast and effecting an automatic focusing operation to such object, and further capable of delaying the start of said search operation for a predetermined period from the detection of said low contrast condition, thus avoiding the start an unnecessary search operation in case such low contrast condition is caused by a vibration of the camera, inducing a temporary deflection of the focusing frame from the object.

Now reference is made to a flow chart in FIG. 6, for explaining the function of a camera of the above-explained structure.

When an unrepresented power switch is actuated, there is started the power supply to the microprocessor PRS, which thus starts the execution of sequence programs stored in the ROM.

Figure 6A:
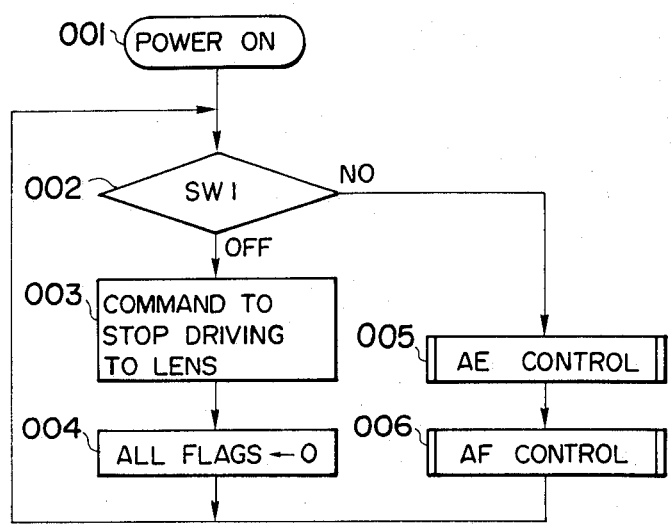

FIG. 6A is a flow chart showing the entire flow of said programs. When the execution of the program is started as explained above, a step (002) detects the state of the switch SW1 to be closed by the actuation of the shutter release button over a first stroke, and, if said switch SW1 is open, a step (003) shifts the signal CLCM from the microprocessor PRS to the H-level, thereby sending a drive stop command as the SO signal to the lens from the circuit LCM. A succeeding step (004) clears all the control flags and variables set in the RAM of the processor PRS. The above-mentioned steps (002), (003) and (004) are repeated until the switch SW1 becomes closed or until the power switch is turned off, so that the lens driving operation is interrupted by turning off the switch SW1 even during the lens driving operation. The detection of the state of said switch SW1 is conducted by shifting the signal CDDR to the H-level to select the circuit DDR, sending a state detection command as the SO signal to said circuit DDR, and a state signal of said switch SW1, detected by said circuit DDR, as the SI signal to the microprocessor PRS. In response to the closing of the switch SW1, the sequence proceeds to a step (005) for an automatic exposure (AE) control subroutine for effecting a series of camera function controls such as light metering and data processing, exposure control, shutter charging after exposure and film advancing. Said AE control subroutine will not be explained in detail, as it is not directly related to the present invention, but the outline of said subroutine is as follows.

During the closed state of the switch SW1 said AE control subroutine is repeatedly executed, and, in each execution there are conducted light metering, data processing for exposure control and the corresponding display. When the switch SW2 is closed by the actuation of the unrepresented shutter release button over a second stroke, a shutter releasing operation is initiated by the interruption function of the microprocessor PRS. The diaphragm or shutter speed is controlled by the exposure amount determined in said exposure control, and, after the exposure, there are conducted a shutter charging and a film advancing operation to complete the photographing operation of a frame.

The camera of the present embodiment has two automatic focusing modes; one-shot mode and servo mode. In the one-shot mode, once a focused state is reached, the focusing operation is not conducted until the switch SW1 is turned off, and the shutter cannot be released until the focused state is reached.

In the servo mode, the focusing operation is conducted even after a focused state is reached, and the shutter can be released any time regardless of the result of the focus detecting operation. Thus the above-mentioned interruption procedure is permitted, in case of the one-shot mode, when the focused state is reached. In the servo mode it is permitted any time, but is temporarily prohibited after the shutter releasing operation, and again permitted after the execution of the AF control subroutine in a step (006). The one-shot mode or the servo mode is selected by an unrepresented mode selecting switch.

The shutter releasing operation is executed by the closing of the switch SW2 as explained before, and, even when the switch SW2 remains closed after the completion of the photographing operation of a frame, the AE control subroutine is considered terminated and the sequence returns to the start. The function of the camera when the switch SW2 is continuously closed is as follows. In the one-shot mode, the shutter releasing operation is permitted when the focused state is reached, thus photographing a frame. Thereafter another photographing operation is executed with the same lens position, since the focusing operation is no longer conducted in the one-shot mode. In this manner the shutter releasing operation is repeated while the switch SW2 is kept closed.

In the servo mode, the shutter is released immediately when the switch SW2 is closed, since the shutter releasing operation is permitted any time. Then the shutter releasing operation is permitted again after a focusing in the AF control subroutine, so that the shutter releasing operation and the AF control operation are alternately executed while the switch SW2 is kept closed. Such a situation will be called "AF continuous releases" and is identified by a flag RLS set to "1" in the AE control subroutine, after the shutter release operation.

Upon termination of the AE control subroutine in the step (005) as explained above, a step (006) for the AF control subroutine is executed.

FIG. 6B shows the flow chart of said AF control subroutine. At first a step (102) detects the automatic focusing mode, by sensing the state of the unrepresented mode selecting switch, through a communication with the switch sensing circuit DDR in the same manner as in the aforementioned detection of the state of the switch SW1.

If the one-shot mode is selected, the sequence proceeds to a step (103) to detect the state of the flag JF, indicating the focused state to be identified in a step (130) of the judgement subroutine to be explained later. Thus the step (103) identifies the preceding focus state from said flag JF. If the flag JF is "1", indicating the presence of the preceding focused state, the sequence proceeds to a step (104) whereby the AE control subroutine is terminated. In this manner, in the one-shot mode, if the focused state is once reached, the AF control subroutine will not be conducted anew until the switch SW1 is turned off and all the flags are cleared in the step (004). As said flag JF is naturally in the cleared state in the first AF control subroutine after the closing of the switch SW1, the sequence proceeds to a step (108).

On the other hand, if the servo mode is identified in the step (102), the sequence proceeds to a step (105).

The step (105) detects the state of the flag RLS, which is set in the AE control subroutine after the shutter releasing operation, as explained before. If the step (105) detects the state "1" of said flag RLS, the AF continuous release mode is identified and the sequence proceeds to a step (106).

In said mode, the step (106) clears all the flags, then a step (107) sets a flag FAF to "1", and the sequence proceeds to a step (129). In the servo mode in which the shutter releasing operation is permitted any time, so that the shutter release subroutine may be initiated by an interruption procedure from any point of the program, and, in order to avoid the influence of the step under execution immediately before branching to said shutter release subroutine, the step (106) clears all the flags. The flag FAF identifies the AF continuous release mode in the AF control subroutine.

If the step (105) detects a state "0" of the flag RLS, the sequence proceeds to a step (108) for detecting the state of a flag PRMV which is related to the lens control as will be explained later and is set to "1" if the lens is driven in the preceding AF control subroutine. In the present example explained is a first flow after the closing of the switch SW1, the flag PRMV is "0" so that the sequence proceeds to a step (112).

The step (112) detects the state of a flag SRMV which is also related to the lens control, and, since SRMV=0 in the present example, the sequence proceeds to a step (129).

Figure 6C:
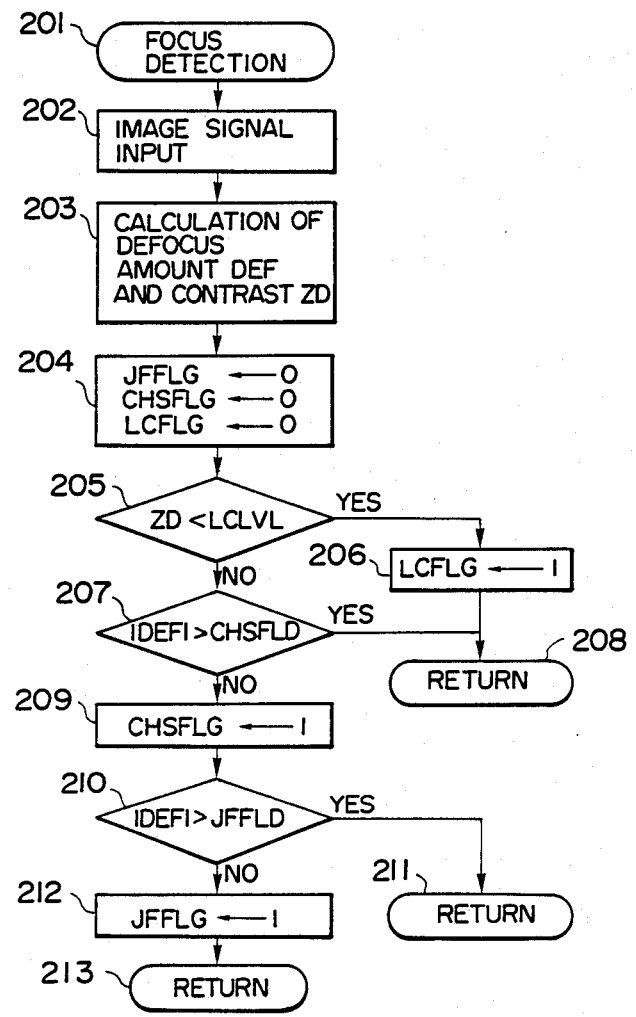

The step (129) executes a focus detection subroutine, shown in FIG. 6C, for detecting the focus state of the photographing lens.

Figure 6D:
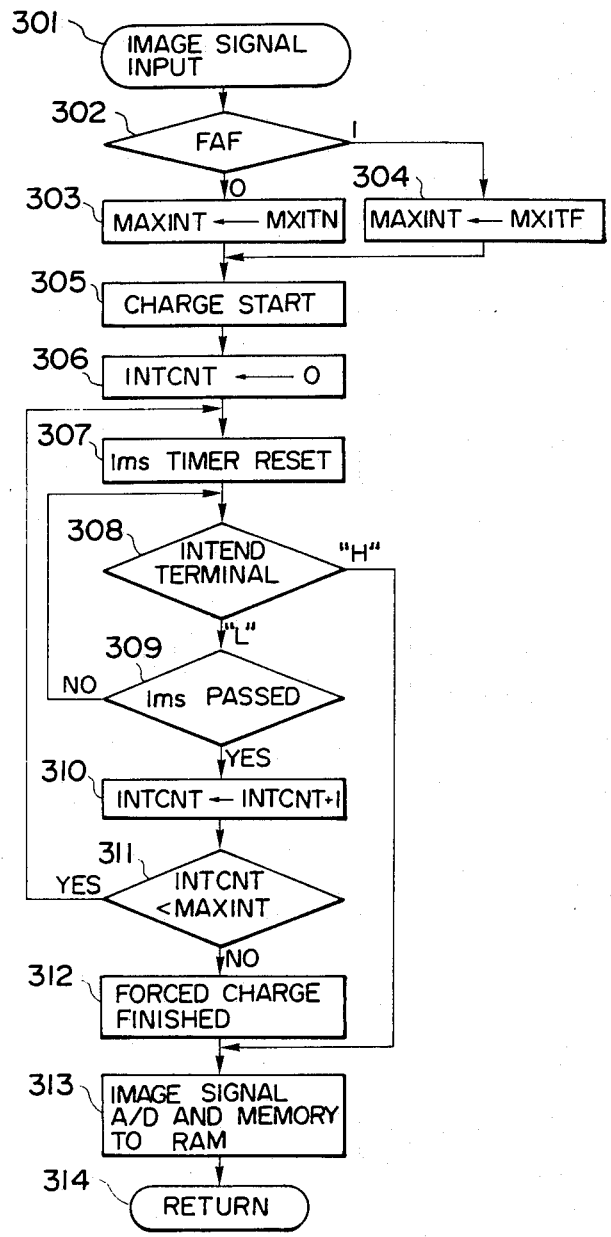
Figure 6E:
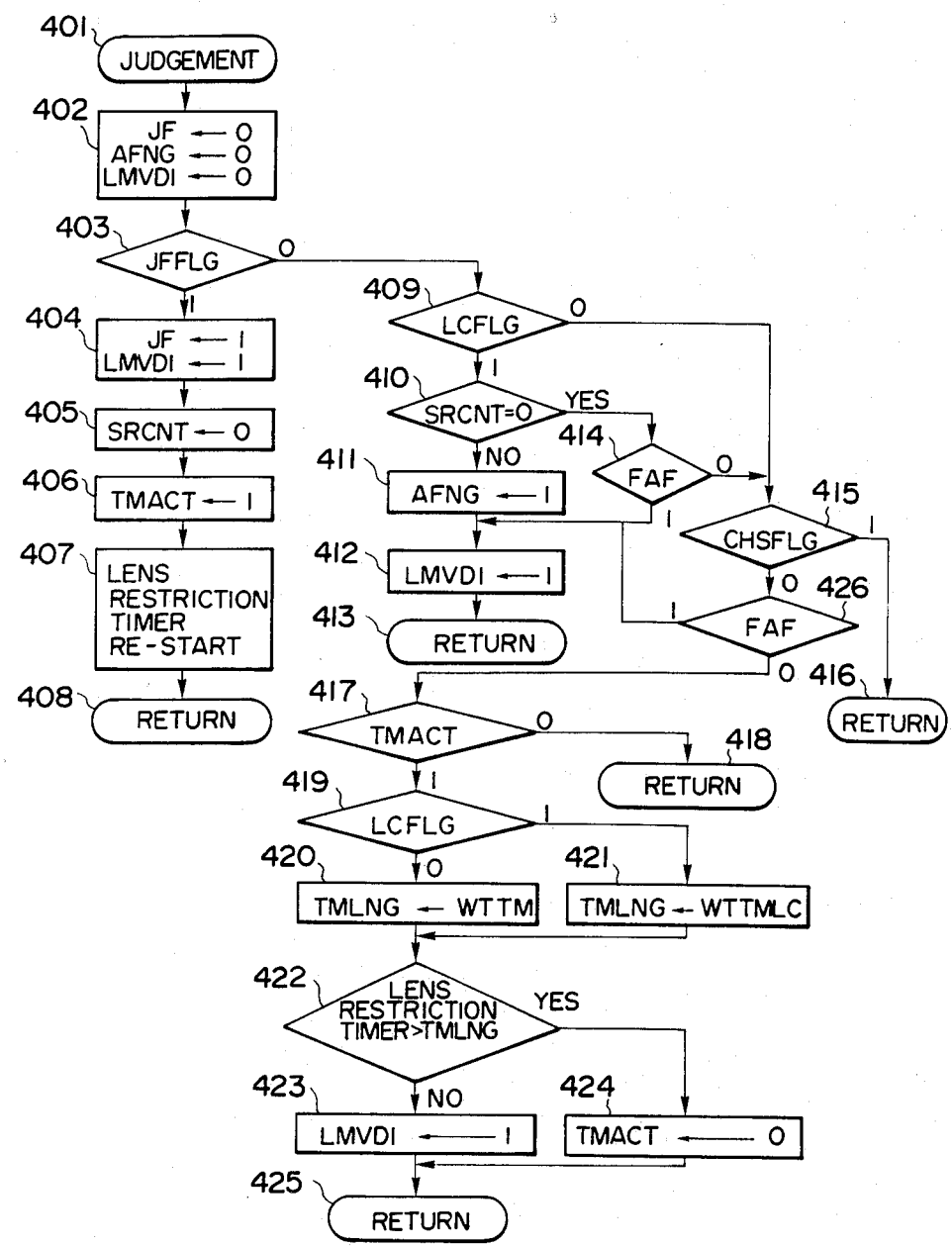

A succeeding step (130) executes a judgement subroutine, shown in FIG. 6E, for identifying a focused state or a focus detection disabled state according to the result of the focus detection subroutine, and sets a lens drive disable flag LMVDI to "1" if the lens driving operation is not required.

A succeeding step (131) executes a display subroutine for displaying the focused state or the focus detection disabled state, by sending certain data to the display circuit DDR to provide a display on the display unit DSP in a similar manner as the communication with the switch SW1. This subroutine will not be explained further as it is not directly related to the present invention.

A step (132) detects the state of the flag LMVDI which is set to "1" if the lens movement is not required as explained above. If LMVDI=1 in the step (132), the sequence proceeds to a step (133) to terminate the AF control subroutine. On the other hand, if LMVDI=0, the sequence proceeds to a step (134) to detect the state of a flag LCFLG.

Said flag LCFLG is a low contrast flag to be set to "1" in the step (129) of the focus detection subroutine when the contrast of the image signal is lower than a predetermined value. If the step (134) detects the state "0" of the flag LCFLG, indicating the presence of a contrast enough for focus a step (135) executes a lens driving operation to be explained later, then a step (136) sets a lens drive flag PRMV to "1", and a step (137) terminates the AF control subroutine.

On the other hand, if the step (134) detects that the flag LCFLG is "1", indicating a low contrast situation, the sequence proceeds to a step (138).

The step (138) and succeeding steps constitute an initial control flow of the so-called search operation. The step (138) executes communication with the lens, receives, from an in-lens control unit LPRS, a count FCNT of a focusing ring counter for counting the output pulses of the encoder ENC, representing the amount of movement of the lens. Said counter is reset to zero at the start of supply of power VL for the lens, and counts upwards said pulses when the lens is advanced, or counts downwards said pulses when the lens is retracted.

Consequently the axial relative position of the focusing lens can be known from the count FCNT of said focusing ring counter.

A succeeding step (139) stores the count FCNT in a conversion area LPOS in the RAM in the microprocessor PRS. Said count indicates the relative position of the lens at the start of the search operation, and is used for returning the lens to said search start position if an object with enough contrast cannot be found in the search operation as will be explained later.

Then a step (140) sends a drive command toward the closest distance position through the circuit LCM to the circuit LPRS, whereby the search operation is initiated. In response the focusing lens is driven toward the closest distance position. In the drive command toward the closest distance position, the circuit LPRS shifts the signal LMF to the H-level thereby rotating the motor LMTR in the forward direction, while in the drive command toward the infinite distance position, the signal LMR is shifted to the H-level to reverse the motor. Said command does not indicate the amount of drive but merely indicates the direction of drive, and, when the focusing lens reaches the mechanical limit position at the closest distance position, the control circuit LPRS detects this fact and terminates the drive. The arrival at said mechanical limit position is detected by the absence of the encoder signal SEC over a predetermined period despite the presence of the lens driving command, and the lens driving operation is terminated. A step (141) sets a variable SRCNT and a flag SRMV to "1". The variable SRCNT indicates the state of the search operation, and is set at "0" in the absence of the search operation, "1" during lens movement toward the closest distance position, "2" during lens movement toward the infinite distance position, or "3" during lens movement toward the lens position at the start of the search operation. In the present example, said variable SRCNT is set at "1" as the lens is driven toward the closest distance position. The flag SRMV indicates that the lens drive or search operation has been conducted. The steps (138) to (141) execute initial control of the search operation, and a step (142) terminates the AF control subroutine.

As explained above, in the first AF control subroutine after the switch SW1 is closed, both in the one-shot mode and in the servo mode, the focus state is detected in the steps (129) and (130), and, in the focused state the AF control subroutine is terminated without the lens driving operation. When a defocus amount is detected in a non-focused state, the step (135) drives the lens in a direction corresponding to the detected defocus, and the AF control is then terminated. Also if a low contrast situation is detected, the lens is driven to the closest distance position and is subjected to a search operation, and the AF control is then terminated.

In FIG. 6A, when the AF control subroutine in the step (006) is terminated, the step (002) again detects the state of the switch SW1, and, if said switch SW1 is open, the step (003) sends a drive stop command to the lens. In this manner the lens driving operation is terminated by the opening of the switch SW1, even if any lens driving command is issued in the preceding AF control subroutine. The succeeding step (004) clears all the flags.

If the step (002) detects the closed state of the switch SW1, the step (005) executes the AE control subroutine, and the step (006) again executes the AF control subroutine.

In the following there will be explained the flow of functions of the second and subsequent AF control subroutines when the switch SW1 is closed.

At first there will be explained a case in which the preceding AF control subroutine did not identify a low contrast situation (flag LCFLG=0) and conducted a lens drive (flag PRMV=1), namely a case in which the lens was driven from a non-focused state toward the focused position.

In the AF control subroutine, a step (102) identifies the mode. In this state the JF flag is "0" as the focused state was not reached in the preceding subroutine, and the shutter release operation is not started yet as the switch SW2 is still open. Consequently the sequence proceeds to the step (108) for detecting the state of the flag PRMV, regardless of the mode. Then the step (109) shifts the signal CLCM from the microprocessor PRS to the H-level, thus communicating with the circuit LPRS and receiving information on the lens drive state from said in-lens control circuit LPRS. Said control circuit counts the pulses from the encoder ENC by a counter, and shifts the signals LMF, LMR to the L-level when said count coincides with the number of pulses corresponding to the defocus amount determined in the focus detecting subroutine, thereby stopping the motor LMTR and terminating the lens drive. Thus a lens stop signal is generated in said control circuit at the end of the lens drive corresponding to said defocus amount, and is supplied to the microprocessor PRS through said communication in the step (109), for identifying whether a lens drive corresponding to the defocus amount has been completed. If the driving operation has been completed and the lens has already been stopped, a step (110) is executed to clear the flag PRMV, and a new focusing operation is started from a step (129). On the other hand, if the lens has not yet been stopped, the sequence proceeds to a step (111) whereby the sequence returns to the start. Thus a new focusing operation is not executed until the drive of an amount instructed by a step (135) in the preceding AF control subroutine, but is only started, from the step (129), after completion of said lens drive. On the other hand, if the steps (129) and (130) in the new focusing operation identify that the lens has moved to the focused state in the preceding lens driving operation, the flags JF, LMVDI are set to "1" and the AF control subroutine is terminated, whereby the lens is maintained at the focused position. Also when the AF control subroutine is repeated from the step (006) hereafter, the step (103) identifies the state "1" of the flag JF in case of the one-shot mode, whereby the focus detecting operation is no longer conducted in such repeated AF control subroutine and the lens is maintained in the focused position reached before. On the other hand, in the servo mode, the above-explained steps (105), (108), (112), (129) and subsequent steps are executed in each repeated AF control subroutine, whereby the lens is moved to a new focused position, following the movement of the object. As explained in the $ foregoing, when the switch SW1 is kept closed and the steps (005) and (006) for the AF control subroutine are repeated, there are repeatedly executed (1) a lens driving operation in response to the defocus amount in a non-focused state, and (2) detection of the defocus amount after the lens drive, and detection of a focus state such as a focused state or a low contrast state, in each AF control subroutine unless a low contrast situation has been identified in the focus detecting operation thereof. In the one-shot mode, the abovementioned repeated operations (1), (2) are terminated once the focused state is identified in said repeated operations, and the lens is maintained at the position where the focused state is identified. On the other hand, in the servo mode, the above-mentioned operations (1), (2) are repeatedly continued, and, if a non-focused state is identified by the movement of the object after the focused state has been identified, the operation (1) drives the lens until a focused state is identified in the operation (2). Thereafter these operations are repeated to drive the lens to the focused position, following the movement of the object.

In the following there will be explained a case in which the preceding AF control subroutine identified a low contrast situation (flag LCFLG=1) and conducted a search operation (flag SRMV=1).

When the AF control subroutine is executed after said search operation, the step (112) detects the state of said flag SRMV, and the sequence proceeds to the step (113). The step (113) receives the state information from the lens, and the sequence proceeds to the step (119) or the step (114), respectively if the lens has been already stopped or if it is still being driven. As already explained in relation to the step (109), the control circuit LPRS generates a lens stop signal after the lens drive corresponding to the defocus amount, but the information on the defocus amount is not given to the lens in the lens driving operation in either direction in the search operation. On the other hand, when the lens has reached the limit position at either end, the pulses from the encoder ENC are no longer generated despite the presence of a lens driving command, and the control circuit LPRS also generates the lens stop signal in response to such a situation. Consequently the step (113) detects said lens stop signal in the same manner as the step (109), thereby selecting the sequence toward the step (119) or (114).

As explained before, the search operation is conducted by:

(1) a lens drive toward a lens position corresponding to the closest object distance (variable SRCNT=1);

(2) a lens drive toward a lens position corresponding to the infinite object distance if the lens has reached the mechanical limit position at said position at the closest object distance without finding an object with enough contrast in the lens drive (1) (variable SRCNT=1); and (3) a lens drive to the start position of the search operation if the lens has reached the mechanical limit position at said position at the infinite object distance without finding an object with enough contrast in the lens drive (2) (variable SRCNT=3).

On the other hand, if the lens is still in a driving operation, the step (114) executes the focus detection subroutine for identifying the defocus amount and the contrast of the object. Then the step (115) detects the state of the low contrast flag LCFLG, and, if it is "1" indicating a low contrast situation, the AF control subroutine returns to the start at the step (117). Thus, in the search operation, the focus detecting operation is conducted during the lens driving operation, and said lens driving operation is continued if a low contrast state is identified. On the other hand, if the focus detecting operation in the course of the lens driving operation identifies the flag LCFLG at a state "0", indicating the absence of low contrast state, the step (116) sends the drive stop command to the lens, by shifting tee signals LMR, LMF to the L-level thereby stopping the lens. Then the step (118) clears the flag SRMV, and the step (129) executes a new focusing operation. Thus, if contrast enough for focus detection is found in the focus detecting operation in the course of the search operation, the search operation is terminated by stopping the lens (SRMV shifted to 0), and the lens is moved to the focused position by a new focusing operation starting from the step (129). If enough contrast cannot be detected during the above-mentioned lens drive (1) toward the lens position corresponding to the closest object distance, each AF control subroutine returns to the start at the step (117) until the focusing lens reaches the mechanical limit position at the closest object distance.

If the lens is driven to the limit position corresponding to the closest object distance without detecting enough contrast, the step (113) detects the stopping of the lens and the sequence proceeds to the step (119). In the above-explained case (1), the sequence proceeds to the step (120). In the above-mentioned case (2), the sequence proceeds from the step (119) to (123), and, in the present example, to the step (124). In the above-mentioned case (3), the sequence proceeds to the step (118) to terminate the search operation. These cases (2) and (3) will be explained further in the following. The step (120) adds 1 to the variable SRCNT for driving the lens toward the infinite distance position. The succeeding step (121) sends a drive command toward the infinite distance position to the lens, in a similar manner as in the lens drive toward the closest distance position, thereby initiating the search operation (2) mentioned above. Then the AF control subroutine returns from the step (122) to the start. During the lens drive (2), the steps (113) and (115) are repeatedly executed until the lens reaches the limit position, and, if enough contrast is not detected, each AF control subroutine returns, from the step (117), to the start in the same manner as in the case (1) explained before. Also if enough contrast is detected during the lens drive toward the infinite distance position, the steps (116) and (118) are executed in the same manner as in the case (1) explained above, and thereafter the lens is moved to the focused position by a sequence starting from the step (120).

On the other hand, if the low contrast situation continues through the lens drive (2) until the lens reaches the limit position at the infinite distance position, the step (113) detects the stopping of the lens, whereupon the sequence proceeds, through the step (119), to the step (123). Since the variable SRCNT is "2" in the search operation (2), the sequence proceeds from the step (123) to (124) for adding 1 to the variable SRCNT, thereby initiating the search operation (3).

The step (125) receives the count FCNT of the aforementioned focusing ring counter, and the step (126) stores a count LPOS - FCNT as the variable FP. The variable LPOS is the count of the focusing ring counter, indicating the lens position in the search operation in the steps (138), (139), while the count FCNT is the current count representing the lens position at the end of the lens drive (2). Consequently the difference Lp, obtained by subtracting the current count from LPOS, indicates the count of the focusing ring counter, from the present lens position to the search start position. Said value FP is supplied to the lens control circuit LPOS in the same manner as in the foregoing communication, for a lens drive of an amount FP in the focusing ring counter. In response the circuit LPOS detects the amount of lens movement from the pulses of the encoder ENC in the same manner as in the ordinary lens driving control based on the defocus amount, thus driving the lens for an amount corresponding to FP, to the search start position. Then the AF control subroutine is returned, at a step (128), to the start. The control functions in the course of the lens drive based on said value FP are the same as in the aforementioned lens drives (1) and (2), and, if enough contrast is detected during the lens drive toward the search start position, the lens is stopped at such detection and the usual focusing operation is started at the step (129). On the other hand, if the focusing lens reaches the search start position without the detection of enough contrast, the step (113) detects the stopping of the lens, and the sequence proceeds through the steps (119) and (123) to the step (118) for clearing the flag SRMV, thereby terminating the search operation. Thereafter a new focusing operation is started at the step (129).

In the following there will be explained the AF continuous release operation in which the switch SW2 is continuously closed in the servo AF mode. In this case, the release flag RLS is set to "1" in the AF control subroutine as explained before. Consequently, in an AF control subroutine after an exposure by the shutter releasing operation, the step (105) detects the state of said flag RLS and the sequence proceeds to the step (106), for clearing all the flags, thus cancelling the prior history of the AF control. The succeeding step (107) sets the AF continuous release flag FAF to "1", and the sequence proceeds to the step (129) for a focusing operation. In the AF continuous release mode, no detection is made on the state of the flags PRMV, SRMV concerning the lens drive and the search operation. The reason for such operation, and the lens driving mode specific to the AF continuous release mode, will be explained later in relation to the lens drive subroutine.

In summary, when the sequence proceeds from the main routine of the camera to the AF control subroutine, there is conducted a focus detecting operation, and, unless a low contrast situation is detected, a lens driving operation is executed according to the defocus amount. A new focusing operation is not conducted until the lens driving operation of a predetermined amount is completed. In case of a low contrast situation, a search operation is initiated by moving the lens toward the closest distance position. The focus detecting operation is continued even during the lens driving operation, then, if an object with enough contrast is detected, the lens driving operation is terminated and the focusing operation is started anew when the lens is stopped. If the lens reaches the limit position at the closest distance side without detection of enough contrast, the lens is then driven toward the infinite distance position, and, if the lens reaches the limit position again, it is then moved toward the search start position. If an enough contrast is detected during these operation, the lens is stopped and a new focusing operation is conducted, but, if the lens reaches the search start position without detecting enough contrast, the search operation is terminated.

FIG. 6C shows a flow chart of the focus detection subroutine.

At first a step (202) executes an image signal input subroutine, shown in FIG. 6D, to store the image signal from the sensor unit SNS in a predetermined area in the microprocessor.

Then a step (203) calculates the defocus amount DEF of the photographing lens and the contrast ZD, from the already stored image signal. The actual calculating method is disclosed for example in the Japanese Patent Application No. 160824/1986 of the present applicant, and will not therefore be explained further.

A step (204) clears three flags JFFLG, CHSFLG and LCFLG. A step (205) compares the contrast ZD with a predetermined value LCLVL, and, if the former is smaller, the sequence proceeds to a step (206) for setting the flag LCFLG to "1". Thus, if the contrast ZD is lower than the constant LCLVL, the low contrast flag LCFLG is set to "1", and a step (208), terminates the focus detection subroutine. In case ZD≧LCLVL in the step (205), a step (207) compares the absolute value of defocus amount DEF with a predetermined value CHSFLD, and, if the former is larger, a step (208) terminates the focus detection subroutine.

On the other hand, if |DEF|≦CHSFLD in the step (207), a step (209) sets the flag CHSFLG to "1". Thus, if the contrast is high enough and the defocus amount is within a range, represented by CHSFLD, close to the focused state, the near focus flag CHSFLG is set to "1".

Then, a step (210) compares the |DEF| with a predetermined amount JFFLD (<CHSFLD), and, if |DEF|>JFSFLD, a step (211) terminates the focus detection subroutine, or, if |DEF|≦JFSFLD, a step (212) sets the flag JFFLG to "1" and a step (213) terminates the focus detection subroutine. Thus the just-focus flag JFFLG is set to "1" if the defocus amount is within a focused range represented by JFFLD.

As explained in the foregoing, the focus detection subroutine detects the defocus amount of the photographing lens and the contrast, and sets the low contrast flag LCFLG to "1" or resets said flag to "0" respectively when the contrast is low or high enough. Also it sets the flag CHSFLG to "1" in case the defocus amount corresponds to a near focus state, or sets the flag JFFLG to "1" in case the defocus amount corresponds to a focused state.

FIG. 6D shows a flow chart of the image signal input subroutine.

In said subroutine, a step (302) detects the state of the AF continuous release flag FAF, and, if it is "1", a step (304) stores a predetermined value MXITF as a variable MAXINT. If it is "0", a step (303) stored a predetermined value MXITN as the variable MAXINT. The variable MAXINT determines the maximum accumulating time of the sensors in the unit of milliseconds, and the value MXITN is selected larger than MXITF. Consequently, in the AF continuous release mode, the maximum accumulating time is selected to be shorter.

A next step (305) causes the sensor unit SNS to start the next accumulation of the image. More specifically, the microprocessor PRS sends an accumulation start command to the sensor drive circuit SDR, which in turn shifts the clear signal CLR for the sensor unit SNS to the L-level, thereby starting the charge accumulation.

A step (306) initializes an accumulation time counter INTCNT, defined in the RAM, to zero. A step (307) then resets a millisecond timer and starts timer operation from the reset state. Said millisecond timer utilizes a timer function of the microprocessor PRS.

A step (308) detects the state of an input port IN-TEND of the microprocessor PRS, thereby identifying whether the charge accumulation has been completed. Simultaneously with the start of the charge accumulation, the sensor drive circuit SDR shifts the signal IN-TEND to the L-level, also monitors the signal AGC from the sensor unit SNS, and, when said AGC signal reaches a predetermined level, shifts the signal IN-TEND to the H-level and the charge transfer signal SH to the H-level for a predetermined period, thereby transferring the charges of the photosensor elements to the CCD devices.

The sequence proceeds either to a step (313) if the signal INTEND is at the H-level in the step (308) indicating the completion of charge accumulation, or to a step (309) if said signal is at the L-level indicating that the accumulation is not yet completed. In the latter case, the step (309) discriminates whether the millisecond timer, cleared as explained before, has measured one millisecond. If one millisecond has not elapsed, the sequence proceeds to the step (308) to await the completion of accumulation or the lapse of one millisecond. Upon lapse of one millisecond before the completion of accumulation, the sequence proceeds to a step (310) for stepwise increasing the content of the accumulation time counter INTCNT. Then a step (311) compares the count of the counter INTCNT with the variable MAX-INT, representing the maximum accumulation time represented in milliseconds. If the former is smaller, the sequence returns to the step (307) to await the completion of accumulation again. On the other hand, if the count INTCNT coincides with MAXINT, the sequence proceeds to a step (312) to forcedly terminate the charge accumulation, by sending an accumulation end command from the microprocessor PRS to the sensor drive circuit SDR. In response to said command, the circuit SDR shifts the charge transfer signal SH to the H-level for a predetermined period, thus transferring the charges from the photoelectric converting elements to the CCD elements. The charge accumulation is completed in a flow up to the step (312). More specifically, if the accumulation is completed within the maximum time MAXINT in the course of the steps (305) to (311), the sequence proceeds to the step (313) at said completion. On the other hand, if the accumulation is not completed within said time, the accumulating operation is forcedly terminated at the expiration of said time and the sequence proceeds to the step (313).

The step (313) executes A/D conversion of the signal ASO obtained by amplifying the image signal OS of the sensor unit SNS with the sensor drive circuit SDR, and storage of the thus obtained digital signal into the RAM. Specifically, the sensor drive circuit SDR supplies a control circuit SSCNT of the sensor unit SNS with CCD driving clock signals $\phi 1$, $\phi 2$ in synchronization with the clock signal CK from the microprocessor PRS, and said clock signals $\phi 1$, $\phi 2$ drive the CCD's of the sensor unit SNS, thereby time-sequentially releasing the charges therein as the image signal OS. Said signal is amplified, by the amplifier in the circuit SDR, to the signal AOS which is supplied to the analog input port of the microprocessor PRS. The microprocessor PRS executes A/D conversion in synchronization with the clock signal CK generated by said microprocessor, and stores the thus converted digital image signal in succession in predetermined addresses of the RAM. Upon completion of the image signal input in this manner, a step (314) terminates the image signal input subroutine. FIG. 6E shows a flow chart of the judgement subroutine.

A step (402) clears a flag JF indicating a focused state, a flag AFNG indicating a focus detection disabled state, and a flag LMVDI indicating a lens drive disabled state.

A step (403) detects the state of the just-focus flag JFFLG to be set in the focus detection subroutine, and, if it is "1" indicating a focused state, the sequence proceeds to a step (404) for setting the flags JF and LMVDI to "1". Then a step (405) clears the count SRCNT which indicates the absence of the search operation at "0", as explained before. The search operation is cancelled when the focused state is reached, but is re-started when a low contrast situation is encountered. Then a step (406) sets the flag TMACT to "1", indicating that a lens drive limiting timer is in operation, as will be explained later. A step (407) then activates said timer, and a step (408) terminates the judgement subroutine. The lens drive limiting timer is composed of an internal timer of the microprocessor PRS and measures the time from the point of said restart.

If the step (403) detects the stage "0" of the just-focus flag JFFLG, the sequence proceeds to a step (409) for detecting the state of the low contrast flag LCFLG to be set in the focus detection subroutine. If said flag LCFLG is "1" indicating a low contrast situation, the sequence proceeds to a step (410).

The step (410) detects the state of the variable SRSNT representing the state of the search operation, and, unless it is "0", the sequence proceeds to a step (411). The non-zero state of the variable SRCNT indicates that a search operation has been conducted after the switch SW1 was turned on, and, in order to prohibit further search operations, a step (411) sets the focus detection disable flag AFNG to "1", and a succeeding step (412) sets the lens drive disabled flag LMVDI to "1". If said flag is set at "1", the sequence in the AF control subroutine, shown in FIG. 6B, proceeds from the step (132) to (133) to terminate said subroutine, so that the search operation starting from the step (138) is not conducted.

If the variable SRCNT is "0" in the step (410), the sequence proceeds to a step (414) for detecting the state of the AF continuous release flag FAF.

If the flag FAF is "1" in the step (414), indicating the AF continuous release mode, the sequence proceeds to a step (412) to set the flag LMVDI to "1", thus prohibiting the search operation, If the FAF flag is "0", the sequence proceeds to a step (415) to effect the AF control subroutine.

The above-mentioned search operation is executed when the focus detection subroutine in the step (129) of the AF control subroutine identifies a low contrast situation whereby the flag LCFLG is set to "1", but the search operation starting from the step (138) is not initiated if the immediately preceding step (132) detects the state "1" of the flag LMVDI or if a low contrast situation is identified in the step (129).

Also even when a low contrast situation is detected in the focus detection subroutine of the step (129) in the judgement subroutine, the search operation is not conducted if the step (410) identifies SRCNT$\neq$0 or if the AF continuous release mode is identified and the flag LMVDI is set to "1" in the step (412).

The SRCNT is not zero if the search operation is conducted before. Therefore, if an AF control subroutine after a search operation identifies a low contrast situation, the sequence proceeds from the step (132) to (133) to terminate the AF control subroutine. In this manner the search operation is conducted only once.

On the other hand, SRCNT is reset to zero when a focused state is identified in the judgement subroutine. Thus, if a low contrast situation is identified in the step (129) of a subsequent AF control subroutine, there is conducted a search operation even when the search operation was conducted before. In the AF continuous release mode, the search operation is not conducted even when a low contrast situation is identified in the step (129). This is to avoid losing the opportunity of a shutter release by a search operation during the AF continuous release mode.

In this manner the search operation is conducted when a low contrast situation is identified except in the AF continuous release mode, but is not repeated when a low contrast situation is identified again in a subsequent AF control subroutine unless a focused state is identified after the preceding search operation.

In the step (409) in if the judgement subroutine identifies that the low contrast flag LCFLG is zero, indicating the presence of an enough contrast, the sequence proceeds to a step (415).

A step (426) detects the state of the AF continuous release flag FAF, and the sequence proceeds to a step (412) or (417) respectively if said flag is "1" or "0". In this manner, if the focus state is not in the near-focus state in the AF continuous release mode, the sequence proceeds to the step (412) thereby prohibiting the lens drive according to the defocus amount. Thus, in the AF continuous release mode, the lens driving operation is entirely prohibited in the low contrast situation, or when the defocus amount is large even if the contrast is sufficiently high, but is permitted when the defocus amount is small so that the lens driving time to the focused state is short. In this manner there can be obtained a short interval between the shutter releasing operations.

A step (417) detects the state of the flag TMACT, and, if it is zero indicating that the lens drive limiting timer is not active, the sequence proceeds to a step (418) to terminate the judgement subroutine. On the other hand, if said flag TMACT is "1", the sequence proceeds to a step (419) to thereafter control said lens drive limiting timer. The step (419) detects the state of the low contrast flag LCFLG, and, if it is "1", the sequence proceeds to a step (421) for storing a predetermined constant WTTMLC as a variable TMLNG. If said flag is "0", a step (420) is executed to store a predetermined constant WTTM as said variable TMLNG. Said variable TMLNG defines the working time of the lens drive limiting timer, and the constant WTTM is selected larger than WTTMLC. The lens driving operation is prohibited if said timer activated at the focused state does not reach said time TMLNG, but is permitted when the timer exceeds said time. Therefore, the time required from the detection of the focused state to the start of a search operation becomes longer in a low contrast situation.

A step (422) compares the count of the lens drive limiting timer in operation with the variable TMLNG, and, if the former is larger, the sequence proceeds to a step (424) for clearing the timer flag TMACT and terminating the judgement subroutine. On the other hand, if the latter is larger in the step (422), the sequence proceeds to a step (423) for setting the lens drive prohibiting flag to "1", and a step (425) terminates the judgement subroutine.

As explained in the foregoing, in the AF continuous release mode, through the steps (415) to (426) explained above, the lens driving operation is conducted immediately in response to the detection of a small defocus amount, but is entirely prohibited in other situations. In other modes, the lens is driven immediately in response to the detection of a small defocus amount, or in response to the detection of a large defocus amount if the focused state is not detected before or if the time WTTM has elapsed after the detection of the focused state. However the lens driving operation is prohibited for a period WTTM after the detection of the focused state, even after detection of a large defocus amount, and is permitted only if the detection of a large defocus continues after the lapse of said period WTTM.

In the search operation, the lens driving operation is immediately conducted if the focused state is not detected before, but is prohibited for a period WTTMLC longer than WTTM if the focused state is detected before. Consequently, if a low contrast situation is encountered for example by a vibration of the camera after the focused state is detected, the search operation is not conducted if the camera is directed again at the desired object within said period, and it is made possible to prevent losing the opportunity of a shutter releasing operation by an unnecessary search operation.

For the same reason the lens driving operation is prohibited for the timer period after the detection of the focused state even when a large defocus amount is detected. In this case the timer period is selected shorter than in the search operation, since the search operation requires a longer lens driving time than in the case of a large defocus amount. In response to the detection of a small defocus amount, the lens is immediately driven in order to follow the movement of the object, since such small defocus, found after the detection of focused state, is due to the movement of the object. On the other hand, a large defocus amount, found after the detection of the focused state, is for example due to a deflection of the lens from the object as explained before, and the lens driving operation is therefore prohibited during the timer period.

Also during the AF continuous release mode, the LMVDI is set to "1" in order to prohibit the search operation.

Consequently the search operation is conducted in a low contrast situation which is not in the AF continuous release mode and which is not preceded by the detection of the focused state in the repeated AF control subroutines, or in a low contrast situation after another search operation only if a focused state is detected thereafter. In the repeated focus detecting operations, the lens is driven immediately if the detected defocus amount is smaller than a predetermined value, but is driven after the lapse of a predetermined period from the preceding detection of the focused state, defined by the lens drive limiting timer, if the detected defocus amount is equal to or larger than said predetermined value.

The lens drive in the search operation is conducted only after the lapse of a period longer than the above-mentioned predetermined period.

The sequence of the entire program and the judgement subroutine explained above can be summarized as follows.

The AE control subroutine and the AF control subroutine are repeated after the switch SW1 is closed, and, if the detected defocus amount is larger than a range that can be regarded as a focused state, the lens is driven in response to said defocus amount. Upon completion of said lens driving operation, the focus detecting operation is repeated. If a focused state is not detected, the lens driving operation according to the detected defocus amount and the focus detecting operation are repeated until a focused state is detected. Once the focused state is identified, the just-focus flag JF and the lens drive disabled flag LMVDI are set to "1", and the lens drive limiting timer is activated at the same time. If the one-shot mode is selected, the focus detecting operation and the lens driving operation are not executed in the subsequent AF control subroutines, and the lens is maintained at a position where the focused state was detected.

In the servo mode, even after the detection of the focused state, the focus detecting operation and the lens driving operation are executed in every AF control subroutine, so that the lens is always driven to the focused position, following the movement of the object.

The aforementioned search operation is conducted if a low contrast situation is identified in the AF control subroutine. However, if a focused state is not detected after the preceding search operation, the LMVDI is set to "1" in order to prohibit the search operation even in a low contrast situation.

The image signal accumulating time in the focus detecting operation is selected shorter in the AF continuous release mode than in the ordinary auto focusing mode, thus minimizing the time required for auto focusing and reducing the interval of the shutter releasing operations.

In the AF continuous release mode, the lens driving operation is permitted only when the defocus amount is small with a sufficient contrast.

Figure 6F:
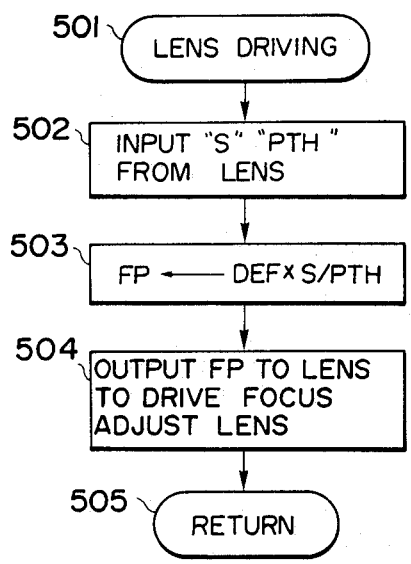

FIG. 6F shows a flow chart of a lens drive subroutine.

In said subroutine, a step (502) performs reception of two data "S" and "PTH" through a communication procedure with the lens. The data "S" is a coefficient of the movement of focusing lens as a function of defocus amount. For example, in case of a single lens moved as a group, S=1 because the entire lens constitutes the focusing lens. The value of S varies in a zoom lens at different zoom positions. The data PTH indicates the amount of movement of the focusing lens, per a pulse of the encoder ENC linked with the axial movement of the focusing lens. These data are stored in a memory of the circuit LPRS, and are supplied to the microprocessor through a communication procedure between said microprocessor and the circuit LPRS.

Consequently the drive amount FP of the focusing lens, represented in the number of pulses of said encoder, is given by an equation:

$$FP = DEF \times S/PTH$$

wherein DEF is the defocus amount of the photographing lens, and S and PTH have the meanings explained above.

A step (503) executes this calculation.

A step (504) sends the value FP determined as explained above to the lens, thereby driving the focusing lens or the photographing lens if it is moved as a group for focusing. A next step (505) terminates the lens drive subroutine.

As explained in the foregoing, the present invention allows an immediate lens driving operation in response to a small defocus found after the detection of the focused state thereby enabling the lens to follow the object, but prohibits the lens driving operation for a predetermined period if a large defocus is found, thereby maintaining a focused state for a desired object even when the focusing field is temporarily deflected from said object for example by vibration.

Also the present invention prohibits the immediate search operation when a low contrast situation is detected after a focused state, thereby preventing unnecessary an search operation in case such a low contrast situation arises for example from temporary deflection of the focusing field from the desired object for example by vibration of the camera.

What is claimed is:

1. An auto-focus camera provided with an optical system, comprising:
    focus detecting means for repeatedly detecting the focusing state of the optical system, and for generating a focus signal representing the focusing state;
    drive means for driving the optical system in response to the focus signal from said focus detecting means; and
    control means for permitting, within a predetermined period of time after the focusing state is indicated by the focus signal from said focus detecting means, said drive means to drive the optical system in response to the focus signal detected by said focus detecting means if an amount of drive of the optical system, represented by said focus signal, is smaller than a predetermined value, and for prohibiting said drive means from driving the optical system in response to said focus signal during said predetermined period of time if said amount of drive is larger than said predetermined value.

2. A camera according to claim 1, wherein said predetermined period of time is determined with respect to the focal length of said imaging optical system.

3. An auto focus camera provided with an imaging optical system, comprising:
    a focus detecting circuit capable of repeatedly detecting the state of focusing of the imaging optical system to an object, and generating a focus signal representing the focus state;
    a drive circuit for driving the imaging optical system in response to the focus signal from said focus detecting circuit; and
    prohibition means adapted for prohibiting said driving circuit from driving the imaging optical system in response to the focus signal detected by said focus detecting circuit during a predetermined period of time after the detection of a just-focus state by said focus detecting circuit, if the amount of drive represented by the focus signal detected by the focus detecting after the detection of the just-focus state is larger than a predetermined value.

4. A camera according to claim 3, wherein said prohibition means is adapted to cancel the prohibiting of the driving of the imaging optical system and to allow said drive circuit to drive the imaging optical system in response to the focus signal even before the expiration of said predetermined period of time if the focus signal obtained in the focus state detection repeated by said focus detecting circuit during said predetermined period of time after the detection of said just-focus state corresponds to a drive amount smaller than said predetermined value.

5. A camera according to claim 3, wherein said predetermined period of time is determined in relation to the focal length of said imaging optical system.

6. A camera provided with an automatic focusing device and an imaging optical system, comprising:
    (a) a focus detecting circuit capable of repeatedly detecting the focus state of the imaging optical system, and generating a focus signal representing each detected focus state;
    (b) a drive circuit for driving said imaging optical system in response to each focus signal generated by said focus detecting circuit;
    (c) timer means activated when a focus signal generated by said focus detecting circuit represents a just-focus state;
    (d) a prohibition circuit for prohibiting the function of said drive circuit during a predetermined period of time measured by said timer means; and
    (e) a control circuit adapted to activate said prohibition circuit thereby prohibiting the driving of the imaging optical system during said predetermined period of time if a focus signal generated by the focus detecting circuit after the release of a focus signal representing in a just-focus state therefrom represents an amount of drive of the imaging optical system equal to or larger than a predetermined value, and adapted to deactivate said prohibiting circuit thereby enabling the driving of the imaging optical system in response to a focus signal even before the expiration of said predetermined period of time if the focus signal represents an amount of drive smaller than said predetermined value.

7. A camera according to claim 6, wherein said control circuit comprises comparator means comparing the amount of drive of said imaging optical system represents by said focus signal with a predetermined drive amount, and for releasing a first signal if said focus signal is larger than the predetermined drive amount, said first signal from said comparator means being adapted to activate said prohibition circuit.

8. A camera according to claim 7, further comprising setting means for setting said predetermined period of time, and wherein said predetermined period of time is determined with respect to a focal length of the imaging optical system.

9. A camera provided with an automatic focusing device and an imaging optical system, comprising:
    (a) a focus detecting circuit for detecting the focus state of the imaging optical system, and for generating a focus signal representing the detected focus state;

(b) a drive circuit for driving the imaging optical system in response to the focus signal generated by said focus detecting circuit; and (c) a prohibition circuit for prohibiting the driving the of the imaging optical system in response to said focus signal during a predetermined period of time after a completion of a photographing operation by said camera.

10. A camera according to claim 9, wherein said prohibition circuit is activated if the focus signal, generated by said focus detecting circuit within said predetermined period of time, represents an amount of drive of the imaging optical system equal to or larger than a predetermined value, but said prohibition circuit is deactivated if said focus signal represent an amount of drive smaller than said predetermined value.

11. A camera provided with an automatic focusing device and an imaging optical system, comprising:

(a) a focus detecting circuit capable of repeatedly detecting the focus state of the imaging optical system, and for generating a focus signal representing the detected focus state;

(b) a drive circuit for driving said imaging optical system in response to the focus signal from said focus detecting circuit;

(c) an accuracy detecting circuit for generating an output signal when the accuracy of the focus signal detected by said focus detecting circuit is lower than a predetermined accuracy;

(d) a search operation control circuit for supplying said drive circuit with a signal, in response to the output signal from said accuracy detecting circuit, for causing a predetermined drive of the imaging optical system, thereby driving said optical system; and (e) a first prohibition circuit for prohibiting the predetermined drive of the imaging optical system by said search operation control circuit during a first predetermined period of time after a just-focus state or a near-focus state is indicated by said focus signal.

12. A camera according to claim 11, further comprising a second prohibition circuit for prohibiting the drive of the imaging optical system by said drive circuit in response to the focus signal for a second predetermined period of time, if the focus signal detected by the focus detecting circuit after a just-focus state or near-focus state is indicated by said focus signal represents an amount of drive of the imaging optical system equal to or larger than a predetermined value.

13. A camera according to claim 12, wherein the second predetermined period of time is shorter than said first predetermined period of time.

14. A camera provided with an automatic focusing device, and an imaging optical system, comprising:

(a) a focus detecting circuit for detecting the focus state of the imaging optical system, and for generating a focus signal representing the focus state;

(b) a drive circuit for driving said imaging optical system in response to the focus signal from said focus detecting circuit; and (c) a control circuit adapted, within a predetermined period after a particular force state is indicated by the focus signal from said focus detecting circuit, for permitting said drive circuit to drive the imaging optical system in response to the focus signal detected by said focus detecting circuit if the amount of drive of the imaging optical system, represented by said focus signal, is smaller than a predetermined value, but prohibiting said drive circuit from driving the imaging optical system in response to said focus signal during said predetermined period of time if said amount of drive is larger than said predetermined value.

15. A camera provided with an automatic focusing device and an imaging optical system, comprising:

(a) a focus detecting circuit for detecting the focus state of the imaging optical system, and for generating a focus signal representing the focus state;

(b) a driving circuit having a first mode for driving the imaging optical system in response to the focus signal from said focus detecting circuit, and a second mode for driving the imaging optical system regardless of the focus signal when the detection of an in-focus state is impossible; and (c) a prohibiting circuit for prohibiting the driving of the imaging optical system in the second mode during a predetermined period of time after a focus signal representing the in-focus state or a near-focus state is detected.

16. An automatic focusing device comprising:

(a) a focus detecting circuit for detecting the focus state of an imaging optical system, and for generating a focus signal representing the focus state;

(b) a driving circuit for driving the imaging optical system in response to the focus signal from said focus detecting circuit; and (c) a prohibiting circuit for prohibiting the driving of the imaging optical system on the basis of said focus signal during a predetermined period of time when the focus signal from said focus detecting circuit represents a driving amount exceeding a predetermined amount.

17. An automatic focusing device comprising:

(a) a focus detecting circuit for detecting the focus state of an imaging optical system, and for generating a focus signal representing the focus state;

(b) a driving circuit for driving the imaging optical system in response to the focus signal from said focus detecting circuit; and (c) a prohibiting circuit for prohibiting said driving circuit from driving the imaging optical system in response to the focus signal generated by said focus detecting circuit when the amount of drive represented by the focus signal after the detection of an in-focus state is larger than a predetermined value.

* * * * *

UNITED STATES PATENT AND TRADEMARK OFFICE
CERTIFICATE OF CORRECTION

PATENT NO. : 4,855,776
DATED : August 8, 1989
INVENTOR(S) : Akira Akashi

It is certified that error appears in the above-identified patent and that said Letters Patent is hereby corrected as shown below:

COLUMN 1:

Line 41, "reason;" should read --reasons;--.

COLUMN 8:

Line 51, "moves" should read --moves to--.

COLUMN 9:

Line 25, "situation" should read --situations--.

COLUMN 12:

Line 19, "closes" should read --closest--.

COLUMN 13:

Line 55, "06" should read --306--.

COLUMN 14:

Line 7, after "with" insert --the time--.

Line 48, "focus," should read --focus--.

UNITED STATES PATENT AND TRADEMARK OFFICE
CERTIFICATE OF CORRECTION

PATENT NO.    : 4,855,776
DATED         : August 8, 1989
INVENTOR(S)   : Akira Akashi It is certified that error appears in the above-identified patent and that said Letters Patent is hereby corrected as shown below:

COLUMN 15:

Line 20, "arrows" should read --allows--.

Line 48, "cases;" should read --cases--.

Line 54, "from" should be deleted.

COLUMN 16:

Line 6, "informing," should read --informing--.

COLUMN 17:

Line 28, "of focused" should read --of the focused--.

COLUMN 21:

Line 3, "executes" should read --execute--.

Line 22, "so-called" should read --a so-called--.

Line 30, "start an" should read --start of an--.

Line 31, "such low" should read --such a low--.

COLUMN 26:

Line 17, "$" should be deleted.

UNITED STATES PATENT AND TRADEMARK OFFICE
CERTIFICATE OF CORRECTION

PATENT NO. : 4,855,776           Page 3 of 4
DATED : August 8, 1989
INVENTOR(S) : Akira Akashi It is certified that error appears in the above-identified patent and that said Letters Patent is hereby corrected as shown below:

COLUMN 27:

Line 23, "tee" should read --the--.

COLUMN 29:

Line 3, "then," should read --and then,--.

Line 10, "an" should be deleted.

Line 11, "operation," should read --operations,--.

Line 34, "(208)," should read --(208)--.

Line 67, "stored" should read --stores--.

COLUMN 32:

Line 12, "SRCNT $\neq 0$" should read --SRCNT $\neq 0$,--.

Line 38, "step (409) in" should read --step (409),--.

Line 40, "an" should be deleted.

COLUMN 34:

Line 60, "the movement of" should read --movement of the--, and "of defocus" should read --of the defocus--.

UNITED STATES PATENT AND TRADEMARK OFFICE
CERTIFICATE OF CORRECTION

PATENT NO. : 4,855,776

DATED : August 8, 1989

INVENTOR(S) : Akira Akashi

It is certified that error appears in the above-identified patent and that said Letters Patent is hereby corrected as shown below:

COLUMN 35:

Line 28, "unnec-" should read --an unnec- --.

Line 29, "an" should be deleted.

Line 57, "auto focus camera" should read --auto-focus camera--.

COLUMN 36:

Line 5, "detecting" should read --detecting circuit--.

Line 19, "in relation" should read --with respect--.

COLUMN 37:

Line 18, "represent" should read --represents--.

Signed and Sealed this

Twenty-fifth Day of December, 1990

*Attest:*

HARRY F. MANBECK, JR.

*Attesting Officer*      *Commissioner of Patents and Trademarks*